United States Patent
Lazarev

(10) Patent No.: US 9,899,150 B2
(45) Date of Patent: Feb. 20, 2018

(54) ENERGY STORAGE DEVICE AND METHOD OF PRODUCTION THEREOF

(71) Applicant: Capacitor Sciences Incorporated, Menlo Park, CA (US)

(72) Inventor: Pavel Ivan Lazarev, Menlo Park, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 113 days.

(21) Appl. No.: 14/710,480

(22) Filed: May 12, 2015

(65) Prior Publication Data

US 2016/0020026 A1 Jan. 21, 2016

Related U.S. Application Data

(60) Provisional application No. 61/991,861, filed on May 12, 2014.

(51) Int. Cl.
*H01G 4/14* (2006.01)
*H01G 4/30* (2006.01)

(52) U.S. Cl.
CPC .............. *H01G 4/14* (2013.01); *H01G 4/30* (2013.01)

(58) Field of Classification Search
CPC .............. H01G 4/14; H01G 4/30; H01G 4/33
See application file for complete search history.

(56) References Cited

U.S. PATENT DOCUMENTS

| | | | |
|---|---|---|---|
| 3,407,394 A | 10/1968 | Hartke | |
| 4,694,377 A | 9/1987 | MacDougall et al. | |
| 4,702,562 A | 10/1987 | Scheuble et al. | |
| 4,894,186 A | 1/1990 | Gordon et al. | |
| 5,187,639 A | 2/1993 | Ogawa et al. | |
| 5,248,774 A | 9/1993 | Dietz et al. | |
| 5,312,896 A | 5/1994 | Bhardwaj et al. | |
| 5,384,521 A | 1/1995 | Coe | |
| 5,395,556 A | 3/1995 | Drost et al. | |
| 5,466,807 A | 11/1995 | Dietz et al. | |
| 5,514,799 A | 5/1996 | Varanasi et al. | |
| 5,581,437 A | 12/1996 | Sebillotte et al. | |
| 5,583,359 A | 12/1996 | Ng et al. | |
| 5,679,763 A | 10/1997 | Jen et al. | |

(Continued)

FOREIGN PATENT DOCUMENTS

| | | |
|---|---|---|
| CN | 203118781 U | 8/2013 |
| CN | 203377785 U | 1/2014 |

(Continued)

OTHER PUBLICATIONS

Hardy, et al. Converting an Electrical Insulator into a Dielectric Capacitor: End-Capping Polystyrene with Oligoaniline. DOI: 10.1021/cm304057f. Chem. Mater., 2013, 25 (5), pp. 799-807.

(Continued)

*Primary Examiner* — Dion R Ferguson
(74) *Attorney, Agent, or Firm* — JDI Patent; Joshua Isenberg; Robert Pullman

(57) ABSTRACT

The present invention relates generally to the fields of electrical engineering and electronics. More specifically, the present invention relates to passive components of electrical circuitry and more particularly to energy storage devices and method of production thereof.

21 Claims, 3 Drawing Sheets

(56) References Cited

U.S. PATENT DOCUMENTS

| | | |
|---|---|---|
| 5,742,471 A | 4/1998 | Barbee et al. |
| 5,840,906 A | 11/1998 | Zoltewicz et al. |
| 5,880,951 A | 3/1999 | Inaba |
| 6,282,081 B1 | 8/2001 | Takabayashi et al. |
| 6,294,593 B1 | 9/2001 | Jeng et al. |
| 6,341,056 B1* | 1/2002 | Allman ............... H01G 4/20 257/295 |
| 6,391,104 B1 | 5/2002 | Schulz |
| 6,426,861 B1 | 7/2002 | Munshi |
| 6,501,093 B1 | 12/2002 | Marks |
| 6,617,830 B2 | 9/2003 | Nozu et al. |
| 6,798,642 B2 | 9/2004 | Decker et al. |
| 7,025,900 B2 | 4/2006 | Sidorenko et al. |
| 7,033,406 B2 | 4/2006 | Weir et al. |
| 7,211,824 B2 | 5/2007 | Lazarev |
| 7,460,352 B2 | 12/2008 | Jamison et al. |
| 7,466,536 B1 | 12/2008 | Weir et al. |
| 7,498,689 B2 | 3/2009 | Mitani et al. |
| 7,579,709 B2 | 8/2009 | Goetz et al. |
| 7,625,497 B2 | 12/2009 | Iverson et al. |
| 7,750,505 B2 | 7/2010 | Ichikawa |
| 7,808,771 B2 | 10/2010 | Nguyen et al. |
| 7,837,902 B2 | 11/2010 | Hsu et al. |
| 7,893,265 B2 | 2/2011 | Facchetti et al. |
| 7,947,199 B2 | 5/2011 | Wessling |
| 8,143,853 B2 | 3/2012 | Jestin et al. |
| 8,222,074 B2 | 7/2012 | Lazarev |
| 8,231,809 B2 | 7/2012 | Pschirer et al. |
| 8,236,998 B2 | 8/2012 | Nagata et al. |
| 8,344,142 B2 | 1/2013 | Marder et al. |
| 8,404,844 B2 | 3/2013 | Kastler et al. |
| 8,527,126 B2 | 9/2013 | Yamamoto et al. |
| 8,552,179 B2 | 10/2013 | Lazarev |
| 8,818,601 B1 | 8/2014 | V et al. |
| 8,929,054 B2 | 1/2015 | Felten et al. |
| 8,938,160 B2 | 1/2015 | Wang |
| 9,056,676 B1 | 6/2015 | Wang |
| 2002/0027220 A1 | 3/2002 | Wang et al. |
| 2002/0048140 A1 | 4/2002 | Gallay et al. |
| 2003/0026063 A1 | 2/2003 | Munshi |
| 2003/0102502 A1 | 6/2003 | Togashi |
| 2003/0142461 A1 | 7/2003 | Decker et al. |
| 2003/0219647 A1 | 11/2003 | Wariishi |
| 2004/0173873 A1 | 9/2004 | Kumar et al. |
| 2004/0222413 A1 | 11/2004 | Hsu et al. |
| 2005/0118083 A1 | 6/2005 | Tabuchi |
| 2006/0120014 A1* | 6/2006 | Nakamura ............ H01G 9/025 361/305 |
| 2006/0120020 A1* | 6/2006 | Dowgiallo, Jr. ........ H01G 4/12 361/313 |
| 2007/0001258 A1 | 1/2007 | Aihara |
| 2007/0108490 A1* | 5/2007 | Tan ...................... H01G 4/20 257/296 |
| 2007/0108940 A1 | 5/2007 | Sainomoto et al. |
| 2007/0159767 A1 | 7/2007 | Jamison et al. |
| 2008/0002329 A1 | 1/2008 | Pohm et al. |
| 2008/0150484 A1 | 6/2008 | Kimball et al. |
| 2008/0266750 A1* | 10/2008 | Wu ........................ H01G 4/06 361/313 |
| 2008/0283283 A1 | 11/2008 | Abe et al. |
| 2009/0040685 A1 | 2/2009 | Hiemer et al. |
| 2009/0184355 A1 | 7/2009 | Brederlow et al. |
| 2010/0038629 A1 | 2/2010 | Lazarev |
| 2010/0085521 A1 | 4/2010 | Kasianova et al. |
| 2010/0178728 A1 | 7/2010 | Zheng et al. |
| 2010/0183919 A1 | 7/2010 | Holme et al. |
| 2010/0193777 A1 | 8/2010 | Takahashi et al. |
| 2010/0214719 A1* | 8/2010 | Kim ...................... H01G 4/33 361/313 |
| 2010/0233491 A1 | 9/2010 | Nokel et al. |
| 2010/0255381 A1 | 10/2010 | Holme et al. |
| 2010/0269731 A1 | 10/2010 | Jespersen et al. |
| 2010/0309606 A1* | 12/2010 | Allers ............... H01L 23/5223 361/306.3 |
| 2010/0309696 A1 | 12/2010 | Guillot et al. |
| 2010/0315043 A1 | 12/2010 | Chau |
| 2011/0006393 A1 | 1/2011 | Cui |
| 2011/0042649 A1 | 2/2011 | Duvall et al. |
| 2011/0079733 A1 | 4/2011 | Langhals et al. |
| 2011/0079773 A1 | 4/2011 | Wasielewski et al. |
| 2011/0110015 A1* | 5/2011 | Zhang ................. H01G 4/20 361/311 |
| 2011/0228442 A1 | 9/2011 | Zhang et al. |
| 2012/0008251 A1 | 1/2012 | Yu et al. |
| 2012/0033342 A1* | 2/2012 | Ito ..................... H01G 4/224 361/301.4 |
| 2012/0053288 A1 | 3/2012 | Morishita et al. |
| 2012/0056600 A1 | 3/2012 | Nevin |
| 2012/0113380 A1 | 5/2012 | Geivandov et al. |
| 2012/0122274 A1 | 5/2012 | Lazarev |
| 2012/0244330 A1 | 9/2012 | Sun et al. |
| 2012/0268862 A1* | 10/2012 | Song ................. H01G 4/0085 361/321.3 |
| 2012/0274145 A1 | 11/2012 | Taddeo |
| 2012/0302489 A1 | 11/2012 | Rodrigues et al. |
| 2013/0056720 A1 | 3/2013 | Kim et al. |
| 2013/0187475 A1 | 7/2013 | Vendik et al. |
| 2013/0194716 A1 | 8/2013 | Holme et al. |
| 2013/0215535 A1 | 8/2013 | Bellomo |
| 2013/0314839 A1 | 11/2013 | Terashima et al. |
| 2013/0342967 A1* | 12/2013 | Lai ..................... B01J 19/126 361/525 |
| 2014/0035100 A1 | 2/2014 | Cho |
| 2014/0036410 A1* | 2/2014 | Okamatsu ............. H01G 4/33 361/321.1 |
| 2014/0098458 A1 | 4/2014 | Almadhoun et al. |
| 2014/0158340 A1 | 6/2014 | Dixler et al. |
| 2014/0185260 A1 | 7/2014 | Chen et al. |
| 2014/0268490 A1 | 9/2014 | Tsai et al. |
| 2014/0347787 A1 | 11/2014 | Fathi et al. |
| 2015/0008735 A1 | 1/2015 | Mizoguchi |
| 2015/0158392 A1 | 6/2015 | Zhao |
| 2015/0162131 A1 | 6/2015 | Felten et al. |
| 2015/0249401 A1 | 9/2015 | Eriksen et al. |
| 2015/0302990 A1* | 10/2015 | Ghosh ................. H01G 4/33 428/141 |
| 2016/0020026 A1 | 1/2016 | Lazarev |
| 2016/0020027 A1 | 1/2016 | Lazarev |
| 2016/0254092 A1 | 9/2016 | Lazarev et al. |
| 2016/0314901 A1 | 10/2016 | Lazarev |
| 2016/0340368 A1 | 11/2016 | Lazarev |
| 2016/0379757 A1 | 12/2016 | Robinson et al. |

FOREIGN PATENT DOCUMENTS

| | | |
|---|---|---|
| CN | 103986224 A | 8/2014 |
| DE | 10203918 A1 | 8/2003 |
| DE | 102010012949 A1 | 9/2011 |
| DE | 102011101304 A1 | 11/2012 |
| DE | 102012016438 A1 | 2/2014 |
| EP | 0493716 A1 | 7/1992 |
| EP | 0585999 A1 | 3/1994 |
| EP | 0602654 A1 | 6/1994 |
| EP | 0729056 A1 | 8/1996 |
| EP | 0791849 A1 | 8/1997 |
| EP | 0986080 A3 | 1/2004 |
| EP | 0865142 B1 | 5/2008 |
| EP | 2062944 A1 | 5/2009 |
| EP | 2415543 A1 | 2/2012 |
| EP | 1486590 B1 | 12/2013 |
| EP | 2759480 A1 | 7/2014 |
| GB | 547853 A | 9/1942 |
| GB | 923148 A | 4/1963 |
| GB | 2084585 B | 11/1983 |
| JP | S6386731 A | 4/1988 |
| JP | H03253014 A | 11/1991 |
| JP | 2786298 B2 | 8/1998 |
| JP | 2007287829 A | 11/2007 |
| JP | 2010106225 A | 5/2010 |
| JP | 2010160989 A | 7/2010 |
| JP | 2011029442 A | 2/2011 |
| JP | 2014139296 A | 7/2014 |

(56) References Cited

FOREIGN PATENT DOCUMENTS

| RU | 2199450 C1 | 2/2003 |
|---|---|---|
| RU | 2512880 C2 | 4/2014 |
| WO | 1990009616 A1 | 8/1990 |
| WO | 0139305 A1 | 5/2001 |
| WO | 2002026774 A2 | 4/2002 |
| WO | 2007078916 A2 | 7/2007 |
| WO | WO 2007/078916 A2 | 7/2007 |
| WO | 2008038047 A2 | 4/2008 |
| WO | 2009158553 A2 | 12/2009 |
| WO | 2011056903 A1 | 5/2011 |
| WO | 2012012672 A2 | 1/2012 |
| WO | 2012084536 A1 | 6/2012 |
| WO | 2012122312 A1 | 9/2012 |
| WO | 2012162500 A2 | 11/2012 |
| WO | 2013009772 A1 | 1/2013 |
| WO | 2013085467 A1 | 6/2013 |
| WO | 2014009686 A1 | 1/2014 |
| WO | 2015003725 A1 | 1/2015 |
| WO | 2015175558 A2 | 11/2015 |

OTHER PUBLICATIONS

Ho, et al. High dielectric constant polyaniline/poly(acrylic acid) composites prepared by in situ polymerization. Synthetic Metals 158 (2008) 630-637.
Solar PV Power Cheaper than Natural Gas. Energy Materials Corporation. PowerPoint. Aug. 10, 2010.
Center for Dielectric Studies, Janosik, et al., "Ultra-High Energy Density Capacitors Through Improved Glass Technology", pp. 1-5 Center for Dielectric Studies Penn State University, dated 2004.
Congressional Research Service, Paul W. Parfomak, "Energy Storage for Power Grids and Electric Transportation: A Technology Assessment", pp. 87-94; Members and Committees of Congress; Mar. 27, 2012.
Hindawi Publishing Corporation, Chávez-Castillo et al, "Third-Order Nonlinear Optical Behavior of Novel Polythiophene Derivatives Functionalized with Disperse Red 19 Chromophore", pp. 1-11, International Journal of Polymer Science vol. 2015, Article ID 219361, Mar. 12, 2015.
Hindawi Publishing Corporation, González-Espasandin et al., "Fuel Cells: A Real Option for Unmanned Aerial Vehicles Propulsion", pp. 1-13, Torrej'on de Ardoz, 28850 Madrid, Spain Jan. 30, 2014.
Hindawi Publishing Corporation, Khalil Ahmed et al., "High dielectric constant polyaniline/poly(acrylic acid) composites prepared by in situ polymerization", pp. 630-637, University of the Punjab, New Campus, Lahore 54590, Oct. 17, 2015.
Institute of Transportation Studies, Burke, et al. "Review of the Present and Future Applications of Supercapacitors in Electric and Hybrid Vehicles", pp. 2-23 UC Davis ITS; Dec. 2014.
International Application No. PCT/US/15/58890, to Pavel Ivan Lazarev, et al., filed Nov. 3, 2015.
International Application No. PCT/US2016/019641, to Pavel Ivan Lazarev, filed Feb. 25, 2016.
International Application No. PCT/US2016/033628, to Pavel Ivan Lazarev, filed May 20, 2016.
International Application No. PCT/US2016/039395, to Matthew R. Robinson, et al., filed Jun. 24, 2016.
International Search Report and Written Opinion for International Application No. PCT/US2015/030415, dated Nov. 4, 2015.
International Search Report and Written Opinion for International Application No. PCT/US2015/058890, dated Feb. 25, 2016.
International Search Report and Written Opinion for International Application No. PCT/US2016/019641, dated Jul. 12, 2016.
International Search Report and Written Opinion for International Application No. PCT/US2016/033628, dated Sep. 1, 2016.
International Search Report and Written Opinion for International Application No. PCT/US2016/039395, dated Oct. 20, 2016.
International Union of Pure and Applied Chemistry Polymer Divison Stejskal et al., "Polyaniline: Thin Films and Colloidal Dispersions (IUPAC Technical Report)", vol. 77, No. 5, pp. 815-826, Russian Academy of Sciences, St. Petersburg 199004, Russia; 2005.
Kontrakt Technology Limited, Alla Sakharova, PhD., "Cryscade Solar Limited: Intellectual Property Portfolio summary", pp. 1-3, Cryscade Solar Limited; Apr. 9, 2015.
Molecular Diversity Preservation International, Barber, et al. "Polymer Composite and Nanocomposite Dielectric Materials for Pulse Power Energy Storage" pp. 1-32; 29 University of South Carolina, Columbia, SC 29208 Oct. 2009.
Non-Final Office Action for U.S. Appl. No. 14/752,600, dated Jan. 23, 2017.
Non-Final Office Action for U.S. Appl. No. 14/919,337, dated Jan. 4, 2017.
Notice of Allowance for U.S. Appl. No. 14/710,491, dated Oct. 24, 2016.
Philosophical Transactions of the Royal Society, SIMON, "Charge storage mechanism in nanoporous carbons and its consequence for electrical double layer capacitors" pp. 3457-3467; Drexel University, Philadelphia, PA 19104, 2010.
Pubchem Open Chemistry Database, Compound Summary for CID 91001799. Mar. 17, 2015. pp. 1-10.
Yue Wang, et. al., "Morphological and Dimensional Control via Hierarchical Assembly of Doped Oligoaniline Single Crystals", J. Am. Chem. Soc. 2012, 134, pp. 9251-9262.
U.S. Appl. No. 14/719,072, to Pavel Ivan Lazarev, filed May 21, 2015.
U.S. Appl. No. 14/752,600, to Matthew R. Robinson, et al., filed Jun. 26, 2015.
U.S. Appl. No. 14/919,337, to Paul T. Furuta, et al., filed Oct. 21, 2015.
U.S. Appl. No. 14/931,757, to Pavel Ivan Lazarev, et al., filed Nov. 3, 2015.
U.S. Appl. No. 15/043,186, to Paul T. Furuta, et al., filed Feb. 12, 2016.
U.S. Appl. No. 15/043,209, to Paul T. Furuta, et al., filed Feb. 12, 2016.
U.S. Appl. No. 15/043,247, to Barry K Sharp, et al., filed Feb. 12, 2016.
U.S. Appl. No. 15/043,315, to Ian S.G. Kelly-Morgan, filed Feb. 12, 2014.
U.S. Appl. No. 15/043,315, to Ivan S.G. Kelley-Morgan, filed Feb. 12, 2016.
U.S. Appl. No. 15/053,943, to Pavel Ivan Lazarev, et al., filed Mar. 14, 2016.
U.S. Appl. No. 15/090,509, to Pavel Ivan Lazarev, et al., filed Mar. 4, 2016.
U.S. Appl. No. 62/121,328, to Pavel Ivan Lazarev et al., filed Feb. 26, 2015.
U.S. Appl. No. 62/294,949, to Pavel Ivan Lazarev, et al., filed Feb. 12, 2016.
U.S. Appl. No. 62/294,955, to Pavel Ivan Lazarev, et al., filed Feb. 12, 2016.
U.S. Appl. No. 62/294,964, to Pavel Ivan Lazarev, et al., filed Feb. 12, 2016.
U.S. Appl. No. 62/318,134, to Pavel Ivan Lazarev, et al., filed Mar. 4, 2016.
Notice of Allowance for U.S. Appl. No. 14/919,337, dated Jul. 19, 2017.
Notice of Allowance for U.S. Appl. No. 14/931,757, dated Jul. 17, 2017.
Notice of Allowance for U.S. Appl. No. 14/752,600, dated Jul. 27, 2017.
Ni, Hai-Lang et al. "Truxene Discotic Liquid Crystals with Two Different Ring Substituents: Synthesis, Metamorphosis and High Charged Carrier Mobility." Liquid Crystals (2013), vol. 40, No. 3, pp. 411-420.
Liang, Mao et al. "Synthesis and Photovoltaic Performance of Two Triarylamine Organic Dyes Based on Truxene." Yinyong Huaxue (2011) vol. 28 No. 12, pp. 1387-1392.
Trevethan, Thomas et al. "Organic Molecules Reconstruct Nanostructures on Ionic Surfaces." Small (2011), vol. 7, No. 9, pp. 1264-1270.

(56) References Cited

OTHER PUBLICATIONS

Lu, Meng et al. "Organic Dyes Incorporating Bis-hexapropyltruxeneamino Moiety for efficient Dye-sensitized Solar Cells." Journal of Physical Chemistry C (2011) vol. 115, No. 1, pp. 274-281.
Li, Li-Li et al. "Synthesis and Mesomorphism of Ether-ester Mixed Tail C3-symmetrical Truxene discotic liquid crystals." Liquid Crystals(2010), vol. 37, No. 5, pp. 499-506.
Isoda, Kyosuke et al. "Truxene-Based Columnar Liquid Crystals: Self-Assembled Structures and Electro-Active Properties." Chemistry—An Asian Journal (2009), vol. 4, No. 10, pp. 1619-1625.
Warmerdam, T. W. et al. "Discotic Liquid Crystals. Physical Parameters of some 2, 3, 7, 8, 12, 13-hexa(alkanoyloxy)truxenes: Observation of a Reentrant Isotropic Phase in a Pure-Disk-like mesogen." Liquid Crystals (1988), vol. 3, No. 8, pp. 1087-1104.
Non-Final Office Action for U.S. Appl. No. 14/719,072, dated Aug. 2, 2017.
Deily, Dielectric and Optical Characterization of Polar Polymeric Materials: Chromophore Entrained PMMA Thin Films, Thesis, 2008.
Department of Chemistry and Biochemistry, Hardy, et al. "Converting an Electrical Insulator into a Dielectric Capacitor: End-Capping Polystyrene with Oligoaniline"; pp. 799-807, Rensselaer Polytechnic Institute, Troy, New York 12180; Feb. 17, 2013.
Deruiter, J. Resonance and Induction Tutorial. Auburn University—Principles of Drug Action 1 Course Material. Spring 2005, 19 pages.
Final Office Action for U.S. Appl. No. 14/919,337, dated May 1, 2017.
Henna Ruuska et al., "A Density Functional Study on Dielectric Properties of Acrylic Acid Crafted Polypropylene", The Journal of Chemical Physics, vol. 134, p. 134904 (2011).
International Search Report and Written Opinion for International Application No. PCT/US2015/030356, dated Jul. 28, 2015.
International Search Report and Written Opinion for International Application No. PCT/US2016/57765, dated Jan. 5, 2017.
International Search Report and Written Opinion for International Application No. PCT/US2017/017146, dated May 11, 2017.
International Search Report and Written Opinion for the International Applicaiton No. PCT/US2017/017150, dated May 18, 2017.
International Search Report and Written Opinion for International Application No. PCT/US2017/24150, dated Jun. 21, 2017.
JACS Articles, Kang et. al., "Ultralarge Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies", pp. 3267-3286; Perugia, Italy Feb. 20, 2007.
Manukian, BK. 216. IR.-spektroskopische Untersuchungen in der Imidazol-Reihe. Helvetica Chimica Acta. 1965, vol. 48, p. 2001.
Microelectronics Research and Communications Institute, Founders et al., "High-Voltage Switching Circuit for Nanometer Scale CMOS Technologies", pp. 1-4, University of Idaho, Moscow, ID 83843 USA, Apr. 30, 2007.
Non-Final Office Action dated Jun. 13, 2017 for U.S. Appl. No. 15/163,595.
Non-Final Office Action for U.S. Appl. No. 15/053,943, dated Apr. 19, 2017.
Non-Final Office Action for U.S. Appl. No. 15/043,186, dated Jun. 2, 2017.
Non-Final/Final Office Action for U.S. Appl. No. 15/043,247, dated Jun. 22, 2017.
Notice of Allowance for U.S. Appl. No. 14/710,491, dated Jan. 19, 2017.
Optical Society of America, Kuzyk et al, "Theory of Molecular Nonlinear Optics", pp. 5, 4-82, Department of Physics and Astronomy, Washington State University, Pullman, Washington 99164-2814, USA, Mar. 26, 2013.
R. J. Baker and B. P. Johnson, "Stacking power MOSFETs for use in high speed instrumentation", Department of Electrical Engineering, University of Nevada, Reno, Reno. Nevada 89557-0030; pp. 5799-5801 Aug. 3, 1992.
Roger D. Hartman and Herbert A. Pohl, "Hyper-electronic Polarization in Macromolecular Solids", Journal of Polymer Science: Part A-1, vol. 6, pp. 1135-1152 (1968).
RSC Publishing, Akl et al., "Molecular materials for switchable nonlinear optics in the solid state, based on ruthenium-nitrosyl complexes", pp. 3518-3527, Porto Alegre, Brazil; May 24, 2013.
Final Office Action for U.S. Appl. No. 15/043,247, dated Oct. 4, 2017.
Handy, Scott T. "Ionic Liquids-Classes and Properties" Published Sep. 2011, Accessed Aug. 28, 2017, InTechweb.org.
Hsing-Yang Tsai et al, "1,6- and 1,7-Regioisomers of Asymmetric and Symmetric Perylene Bisimides: Synthesis, characterization and Optical Properties" Molecules, 2014, vol. 19, pp. 327-341.
Hsing-Yang Tsai et al, "Synthesis and optical properties of novel asymmetric perylene bisimides", Journal of Luminescence, vol. 49, pp. 103-111 (2014).
International Search Report and Written Opinion for International Application No. PCT/US2017/24600, dated Aug. 14, 2017.
International Search Report and Written Opinion for International Application No. PCT/US2017/016862, dated Aug. 14, 2017.
International Search Report and Written Opinion for International Application No. PCT/US2017/24371, dated Aug. 29, 2017.
Johnson, Kieth E. "What's an Ionic Liquid?" The Electrochemical Society Interface, Published Spring 2007, pp. 38-41, Accessed Aug. 28 2017.
Maddalena, Francesco "Why are Ionic Liquids, Liquids?" http://www.quora.com/why-are-ionic-liquids-liquids?, Published Jan. 26, 2017, Accessed Aug. 28, 2017.
Nagabrahmandachari et al. "Synthesis and Spectral Analysis of Tin Tetracarboxylates and Phosphinates" Indian Journal of Chemistry-Section A, 1995, vol. 34A, pp. 658-660.
Non-Final Office Action for U.S. Appl. No. 15/194,224, dated Sep. 27, 2017.
Notice of Allowance for U.S. Appl. No. 14/919,337, dated Nov. 8, 2017.
Notice of Allowance for U.S. Appl. No. 14/931,757, dated Oct. 31, 2017.
Notice of Allowance for U.S. Appl. No. 15/053,943, dated Aug. 14, 2017.
Taiwan Office Action for TW Application No. 106104501, dated Oct. 19, 2017.
Extended European Search Report for Application No. 15792405.1, dated Nov. 10, 2017.
Notice of Allowance for U.S. Appl. No. 14/719,072, dated Nov. 16, 2017.
Notice of Allowance for U.S. Appl. No. 14/752,600, dated Nov. 24, 2017.
Notice of Allowance for U.S. Appl. No. 14/752,600, dated Dec. 4, 2017.
D C Tiwari, et al: "Temperature dependent studies of electric and dielectric properties of polythiophene based nano composite", Indian Journal of Pure & Applied Physics vol. 50, Jan. 2012. pp. 49-56.
Extended European Search Report for Application No. 15792494.5, dated Dec. 11, 2017.
Non-Final Office Action for U.S. Appl. No. 15/043,315, dated Dec, 26, 2017.
Notice of Allowance for U.S. Appl. No. 14/931,757, dated Dec. 29, 2017.
Office Action dated Dec. 13, 2017 for Taiwan Patent Application No. 106104499.
Office Action dated Dec. 13, 2017 for Taiwan Patent Application No. 106104500.

* cited by examiner

ENERGY STORAGE DEVICE AND METHOD OF PRODUCTION THEREOF

CROSS-REFERENCE

This application claims the benefit of U.S. Provisional Application No. 61/991,861, filed May 12, 2014, which is entirely incorporated herein by reference.

FIELD OF THE INVENTION

The present invention relates generally to passive components of electrical circuit and more particularly to energy storage devices and method of production thereof.

BACKGROUND OF THE INVENTION

A capacitor is a passive electronic component that is used to store energy in the form of an electrostatic field, and comprises a pair of electrodes separated by a dielectric layer. When a potential difference exists between two electrodes, an electric field is present in the dielectric layer. This field stores energy and an ideal capacitor is characterized by a single constant value of capacitance which is a ratio of the electric charge on each electrode to the potential difference between them. In practice, the dielectric layer between electrodes passes a small amount of leakage current. Electrodes and leads introduce an equivalent series resistance, and dielectric layer has limitation to an electric field strength which results in a breakdown voltage. The simplest energy storage device consists of two parallel electrodes separated by a dielectric layer of permittivity $\in$, each of the electrodes has an area S and is placed on a distance d from each other. Electrodes are considered to extend uniformly over an area S, and a surface charge density can be expressed by the equation: $\pm\rho=\pm Q/S$. As the width of the electrodes is much greater than the separation (distance) d, an electrical field near the centre of the capacitor will be uniform with the magnitude $E=\rho/\in$. Voltage is defined as a line integral of the electric field between electrodes. An ideal capacitor is characterized by a constant capacitance C defined by the formula (1)

$$C=Q/V, \tag{1}$$

which shows that capacitance increases with area and decreases with distance. Therefore the capacitance is largest in devices made of materials of high permittivity.

A characteristic electric field known as the breakdown strength $E_{bd}$, is an electric field in which the dielectric layer in a capacitor becomes conductive. Voltage at which this occurs is called the breakdown voltage of the device, and is given by the product of dielectric strength and separation between the electrodes, $$V_{bd}=E_{bd}d \tag{2}$$

The maximal volumetric energy density stored in the capacitor is limited by the value proportional to $\sim\in\cdot E^2_{bd}$, where $\in$ is dielectric permittivity and $E_{bd}$ is breakdown strength. Thus, in order to increase the stored energy of the capacitor it is necessary to increase dielectric permeability $\in$ and breakdown strength $E_{bd}$ of the dielectric.

For high voltage applications much larger capacitors have to be used. There are a number of factors that can dramatically reduce the breakdown voltage. Geometry of the conductive electrodes is important for these applications. In particular, sharp edges or points hugely increase the electric field strength locally and can lead to a local breakdown. Once a local breakdown starts at any point, the breakdown will quickly "trace" through the dielectric layer till it reaches the opposite electrode and causes a short circuit.

Breakdown of the dielectric layer usually occurs as follows. Intensity of an electric field becomes high enough free electrons from atoms of the dielectric material and make them conduct an electric current from one electrode to another. Presence of impurities in the dielectric or imperfections of the crystal structure can result in an avalanche breakdown as observed in semiconductor devices.

Other important characteristic of a dielectric material is its dielectric permittivity. Different types of dielectric materials are used for capacitors and include ceramics, polymer film, paper, and electrolytic capacitors of different kinds. The most widely used polymer film materials are polypropylene and polyester. Increase of dielectric permittivity allows increasing of volumetric energy density which makes it an important technical task.

An ultra-high dielectric constant composite of polyaniline, PANI-DBSA/PAA, was synthesized using in situ polymerization of aniline in an aqueous dispersion of polyacrylic acid (PAA) in the presence of dodecylbenzene sulfonate (DBSA) (see, Chao-Hsien Hoa et al., "High dielectric constant polyaniline/poly(acrylic acid) composites prepared by in situ polymerization", Synthetic Metals 158 (2008), pp. 630-637). The water-soluble PAA served as a polymeric stabilizer, protecting the PANI particles from macroscopic aggregation. A very high dielectric constant of ca. $2.0*10^5$ (at 1 kHz) was obtained for the composite containing 30% PANI by weight. Influence of the PANI content on the morphological, dielectric and electrical properties of the composites was investigated. Frequency dependence of dielectric permittivity, dielectric loss, loss tangent and electric modulus were analyzed in the frequency range from 0.5 kHz to 10 MHz. SEM micrograph revealed that composites with high PANI content (i.e., 20 wt. %) consisted of numerous nano-scale PANI particles that were evenly distributed within the PAA matrix. High dielectric constants were attributed to the sum of the small capacitors of the PANI particles. The drawback of this material is a possible occurrence of percolation and formation of at least one continuous conductive path under electric field with probability of such an event increasing with an increase of the electric field. When at least one continuous path (track) through the neighboring conducting PANI particles is formed between electrodes of the capacitor, it decreases a breakdown voltage of such a capacitor.

Single crystals of doped aniline oligomers are produced via a simple solution-based self-assembly method (see, Yue Wang, et. al., "Morphological and Dimensional Control via Hierarchical Assembly of Doped Oligoaniline Single Crystals", J. Am. Chem. Soc. 2012, 134, pp. 9251-9262). Detailed mechanistic studies reveal that crystals of different morphologies and dimensions can be produced by a "bottom-up" hierarchical assembly where structures such as one-dimensional (1-D) nanofibers can be aggregated into higher order architectures. A large variety of crystalline nanostructures, including 1-D nanofibers and nanowires, 2-D nanoribbons and nanosheets, 3-D nanoplates, stacked sheets, nanoflowers, porous networks, hollow spheres, and twisted coils, can be obtained by controlling the nucleation of the crystals and the non-covalent interactions between the doped oligomers. These nanoscale crystals exhibit enhanced conductivity compared to their bulk counterparts as well as interesting structure-property relationships such as shape-dependent crystallinity. Furthermore, the morphology and dimension of these structures can be largely rationalized and predicted by monitoring molecule-solvent interactions via absorption studies. Using doped tetra-aniline as a model system, the results and strategies presented in this article provide insight into the general scheme of shape and size control for organic materials.

There is a known energy storage device based on a multilayer structure. The energy storage device includes first and second electrodes, and a multilayer structure comprising blocking and dielectric layers. The first blocking layer is disposed between the first electrode and a dielectric layer, and the second blocking layer is disposed between the second electrode and a dielectric layer. Dielectric constants of the first and second blocking layers are both independently greater than the dielectric constant of the dielectric layer. FIG. 1 shows one exemplary design that includes electrodes 1 and 2, and multilayer structure comprising layers made of dielectric material (3, 4, 5) which are separated by layers of blocking material (6, 7, 8, 9). The blocking layers 6 and 9 are disposed in the neighborhood of the electrodes 1 and 2 accordingly and characterized by higher dielectric constant than dielectric constant of the dielectric material. A drawback of this device is that blocking layers of high dielectric permittivity located directly in contact with electrodes can lead to destruction of the energy storage device. Materials with high dielectric permittivity which are based on composite materials and containing polarized particles (such as PANI particles) might demonstrate a percolation phenomenon. The formed polycrystalline structure of layers has multiple tangling chemical bonds on borders between crystallites. When the used material with high dielectric permittivity possesses polycrystalline structure a percolation might occur along the borders of crystal grains. Another drawback of the known device is an expensive manufacturing procedure which is vacuum deposition of all layers.

Capacitors as energy storage device have well-known advantages versus electrochemical energy storage, e.g. a battery. Compared to batteries, capacitors are able to store energy with very high power density, i.e. charge/recharge rates, have long shelf life with little degradation, and can be charged and discharged (cycled) hundreds of thousands or millions of times. However, capacitors often do not store energy in small volume or weight as in case of a battery, or at low energy storage cost, which makes capacitors impractical for some applications, for example electric vehicles. Accordingly, it would be an advance in energy storage technology to provide capacitors of higher volumetric and mass energy storage density and lower cost.

The present invention solves a problem of the further increase of volumetric and mass density of reserved energy of the energy storage device, and at the same time reduces cost of materials and manufacturing process.

SUMMARY OF THE INVENTION

The present invention provides an energy storage device comprising a first electrode, a second electrode, and a solid multilayer structure disposed between said first and second electrodes. Said electrodes are flat and planar and positioned parallel to each other, and said solid multilayer structure comprises m homogeneous insulating and conductive layers. Said layers are disposed parallel to said electrodes, and said layers has following sequence: A-B-(A-B- . . . A-B-)A, where A is an insulating layer which comprises an insulating dielectric material, B is a conductive layer, and number of layers m is equal or more than 3.

In a yet further aspect, the present invention provides a method of producing an energy storage device, which comprises the steps of (a) preparation of a conducting substrate serving as one of the electrodes, (b) formation of a solid multilayer structure, and (c) formation of the second electrode on the multilayer structure, wherein formation of the multilayer structure comprises alternating steps of the application of insulating and conductive layers or a step of coextrusion of layers.

DETAILED DESCRIPTION OF THE INVENTION

Figure 1:
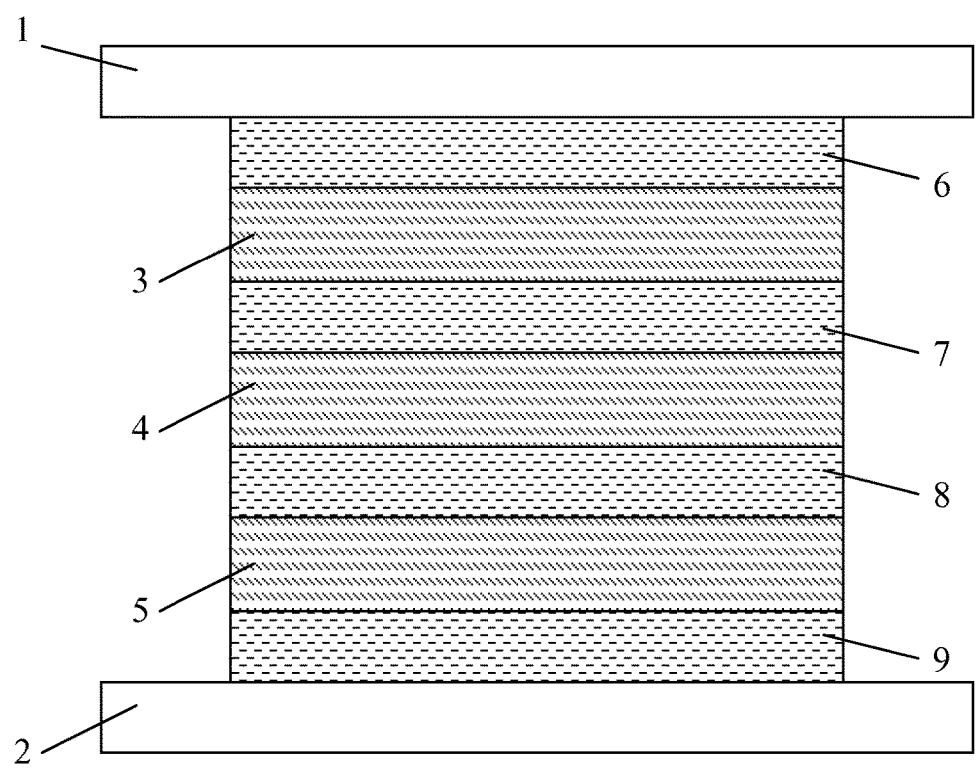
FIG. 1 is a schematic illustration that shows an energy storage device.

The general description of the embodiments of the present invention having been made, a further understanding can be obtained by reference to the specific preferred embodiments, which are given herein only for the purpose of illustration and are not intended to limit the scope of the appended claims.

An energy storage device is disclosed herein. Depending on the application, dielectric permittivity of the insulating dielectric material $\epsilon_{ins}$ may be in the broad range; for most applications it will be in the range between about 2 and 25. The insulating layer comprises a material characterized by a band gap of greater than 4 eV and by breakdown field strength in the range between about of 0.01 V/nm and greater than 2.5 V/nm. Due to high polarizability, the conductive material possesses relatively high dielectric permittivity $\epsilon_{cond}$ in comparison with dielectric permittivity of the insulating dielectric material. Thus, the layer comprising the conductive material possesses dielectric permittivity $\epsilon_{cond}$, which 10-100,000 times greater than dielectric permittivity $\epsilon_{ins}$ of the material of the insulating layer. Therefore the electric field intensity of the insulating layer $E_{ins}$ and electric field intensity of the conductive layer $E_{cond}$ satisfy the following ratio: $E_{cond}=(\epsilon_{ins}/\epsilon_{cond})\cdot E_{ins}$. Therefore electric field intensity $E_{cond}$ is much smaller than electric field intensity $E_{ins}$. Therefore in order to increase a working voltage of the energy storage device it is required to increase number of the insulating layers.

Capacitor of the energy storage device according to the present invention is determined by the following expression:

$$C=[d_{ins}\cdot n_{ins}/(\epsilon_0\epsilon_{ins}S)+d_{cond}\cdot(n_{ins}-1)/(\epsilon_0\epsilon_{cond}\cdot S)]^{-1}=\epsilon_0\cdot S\cdot[d_{ins}\cdot n_{ins}/\epsilon_{ins}+d_{cond}\cdot(n_{ins}-1)/\epsilon_{cond}]^{-1}, \qquad (3)$$

where $d_{ins}$ is thickness of the insulating layer, $d_{cond}$ is thickness of the conductive layer, $n_{ins}$ is number of the insulating layers, $\epsilon_0$ is dielectric permittivity of vacuum.

According to the formula (3), value of the capacitor of the energy storage device is determined by the layers with high dielectric permittivity if the following inequality is carried out:

$$d_{cond} \gg (n_{ins}/(n_{ins}-1)\cdot(\epsilon_{cond}/\epsilon_{ins})\cdot d_{ins} \text{ or}$$

$$d_{cond}=p\cdot(n_{ins}/(n_{ins}-1)\cdot(\epsilon_{cond}/\epsilon_{ins})\cdot d_{ins}, \text{ where } p\geq 3, \qquad (4)$$

$$\text{if } n_{ins} \gg 1 \text{ than } d_{cond}=p\cdot(\epsilon_{cond}/\epsilon_{ins})\cdot d_{ins}. \qquad (5)$$

Thus, insulating layers provide a high breakdown voltage of the capacitor, and conductive layers provide high dielectric permittivity of the multilayered structure.

In some embodiments of the invention, the solid insulating dielectric layers may possess a different structure in the range between an amorphous and crystalline solid layer, depending on the material and manufacturing procedure used.

In one embodiment of the disclosed energy storage device, the insulating layers comprise modified organic compounds of the general structural formula I:

$$\{Cor\}(M)n, \qquad (I)$$

where Cor is a polycyclic organic compound with conjugated π-system, M are modifying functional groups; and n is the number of the modifying functional groups, where n is $\geq 1$. In one embodiment of the present invention, the polycyclic organic compound is selected from the list comprising oligophenyl, imidazole, pyrazole, acenaphthene, triaizine, indanthrone and having a general structural formula selected from structures 1-43 as given in Table 1.

TABLE 1

Examples of polycyclic organic compounds for the insulating layers

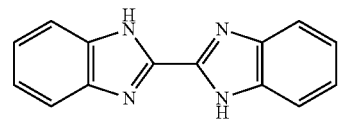 [SMILES: c1ccc2[nH]c(-c3nc4ccccc4[nH]3)nc2c1]

1

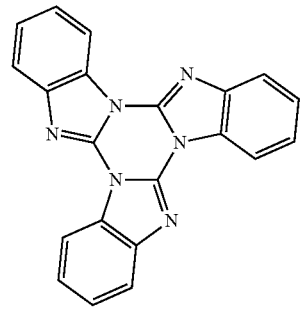 [SMILES: c1ccc2c(c1)nc1n2c2nc3ccccc3n2c2nc3ccccc3n12]

2

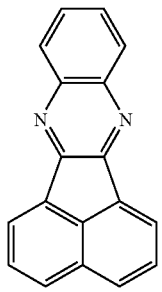 [SMILES: c1cc2c3c(cccc3c1)-c1nc3ccccc3nc1-2]

3

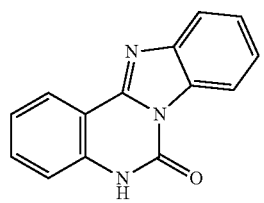 [SMILES: O=c1[nH]c2ccccc2c2nc3ccccc3n12]

4

TABLE 1-continued
Examples of polycyclic organic compounds for the insulating layers
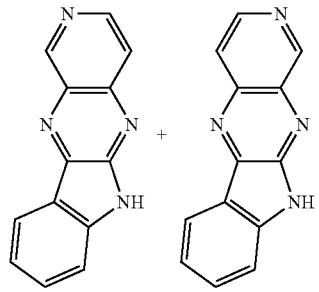 [SMILES: c1ccc2c(c1)[nH]c1nc3ccncc3nc12 ; c1ccc2c(c1)[nH]c1nc3cnccc3nc12]
5
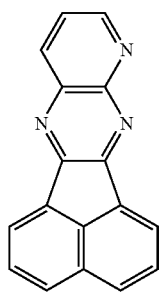 [SMILES: c1cc2c3c(cccc3c1)-c1nc3ncccc3nc1-2]
6
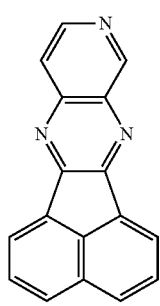 [SMILES: c1cc2c3c(cccc3c1)-c1nc3cnccc3nc1-2]
7
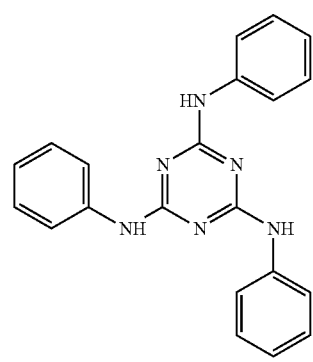 [SMILES: c1ccc(Nc2nc(Nc3ccccc3)nc(Nc3ccccc3)n2)cc1]
8

TABLE 1-continued
Examples of polycyclic organic compounds for the insulating layers
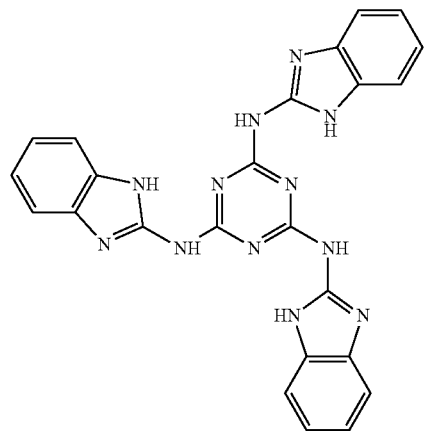 [SMILES: c1ccc2[nH]c(Nc3nc(Nc4nc5ccccc5[nH]4)nc(Nc4nc5ccccc5[nH]4)n3)nc2c1]
9
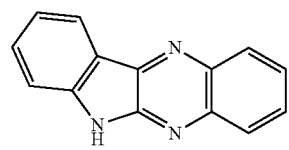 [SMILES: c1ccc2nc3c(nc2c1)[nH]c1ccccc13]
10
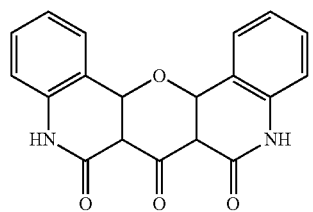 [SMILES: O=C1Nc2ccccc2C2OC3c4ccccc4NC(=O)C3C(=O)C12]
11
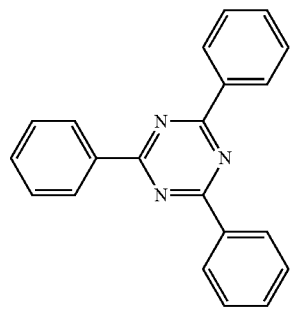 [SMILES: c1ccc(-c2nc(-c3ccccc3)nc(-c3ccccc3)n2)cc1]
12
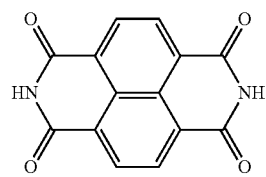 [SMILES: O=C1NC(=O)c2ccc3c4c(ccc1c24)C(=O)NC3=O]
13
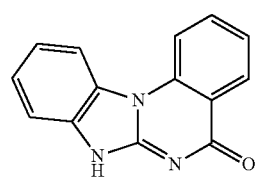 [SMILES: O=c1nc2[nH]c3ccccc3n2c2ccccc12]
14

TABLE 1-continued
Examples of polycyclic organic compounds for the insulating layers
| | |
|---|---|
| 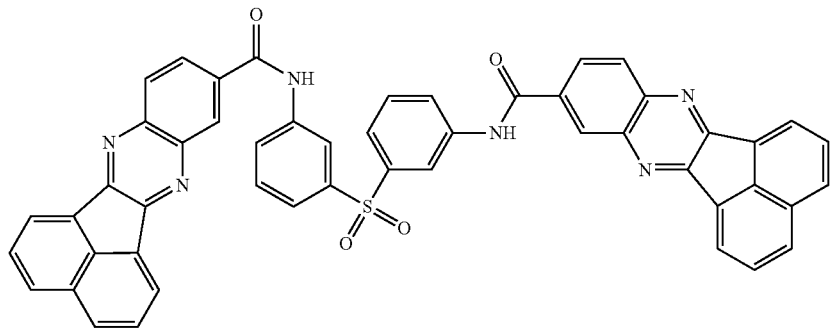 [SMILES: O=C(Nc1cccc(S(=O)(=O)c2cccc(NC(=O)c3ccc4nc5c(nc4c3)-c3cccc4cccc-5c34)c2)c1)c1ccc2nc3c(nc2c1)-c1cccc2cccc-3c12] | 15 |
| 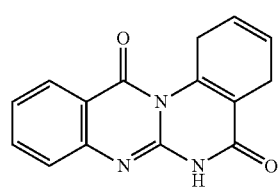 [SMILES: O=c1[nH]c2nc3ccccc3c(=O)n2c2c1CC=CC2] | 16 |
| 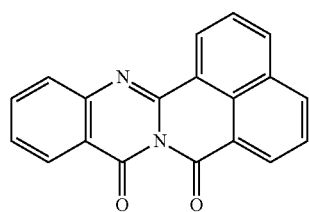 [SMILES: O=c1c2ccccc2nc2c3cccc4cccc(c(=O)n12)c43] | 17 |
| 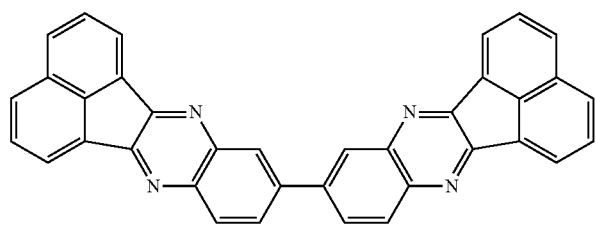 [SMILES: c1cc2c3c(cccc3c1)-c1nc3cc(-c4ccc5nc6c(nc5c4)-c4cccc5cccc-6c45)ccc3nc1-2] | 18 |
| 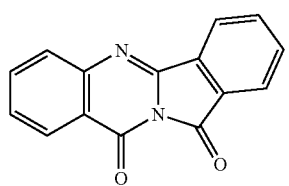 [SMILES: O=C1c2ccccc2-c2nc3ccccc3c(=O)n21] | 19 |
| 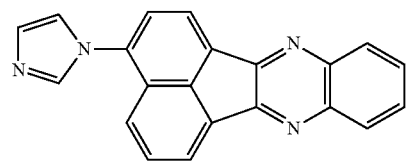 [SMILES: c1ccc2nc3c(nc2c1)-c1cccc2c(-n4ccnc4)ccc-3c12] | 20 |
| 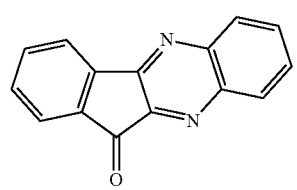 [SMILES: O=C1c2ccccc2-c2nc3ccccc3nc21] | 21 |

TABLE 1-continued
Examples of polycyclic organic compounds for the insulating layers
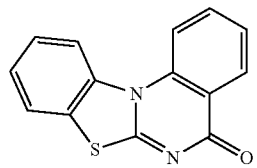 [SMILES: O=c1nc2sc3ccccc3n2c2ccccc12]
22
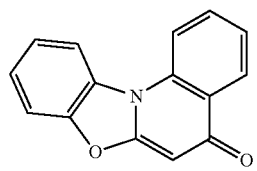 [SMILES: O=c1cc2oc3ccccc3n2c2ccccc12]
23
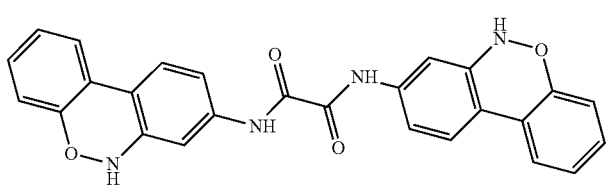 [SMILES: O=C(Nc1ccc2c(c1)NOc1ccccc1-2)C(=O)Nc1ccc2c(c1)NOc1ccccc1-2]
24
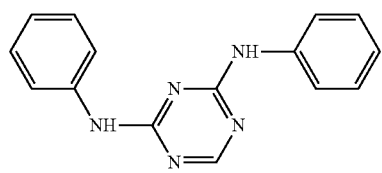
25
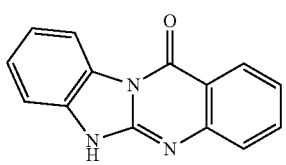 [SMILES: O=c1c2ccccc2nc2[nH]c3ccccc3n12]
26
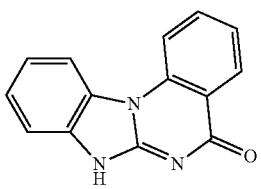 [SMILES: O=c1nc2[nH]c3ccccc3n2c2ccccc12]
27
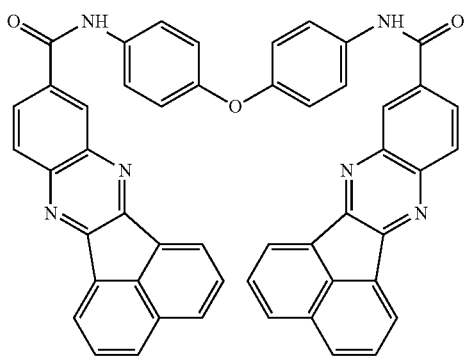 [SMILES: O=C(Nc1ccc(Oc2ccc(NC(=O)c3ccc4nc5c(nc4c3)-c3cccc4cccc-5c34)cc2)cc1)c1ccc2nc3c(nc2c1)-c1cccc2cccc-3c12]
28

TABLE 1-continued
Examples of polycyclic organic compounds for the insulating layers
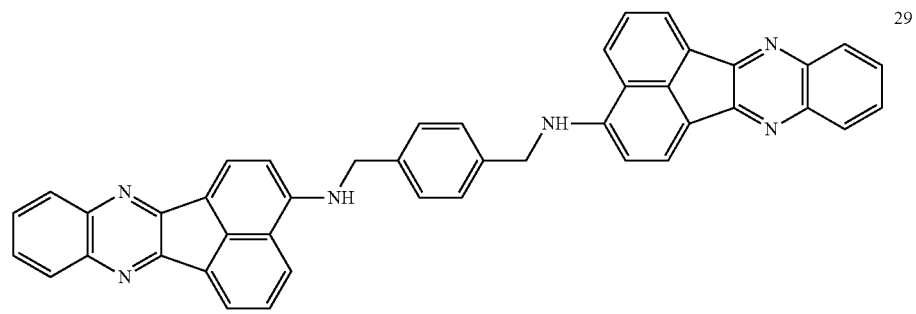
29
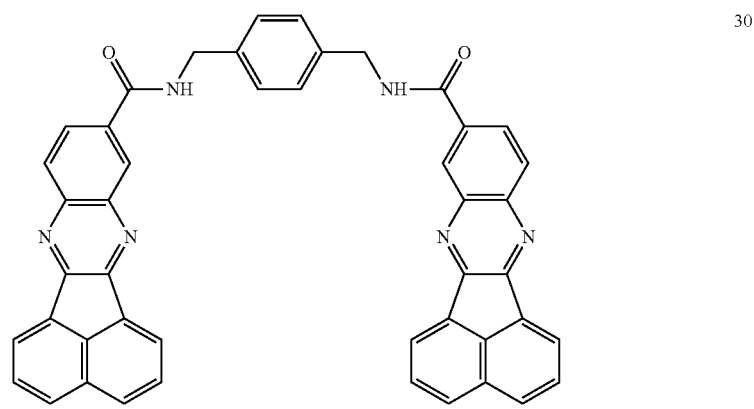
30
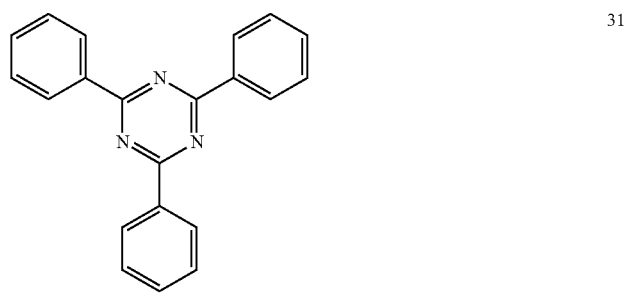
31
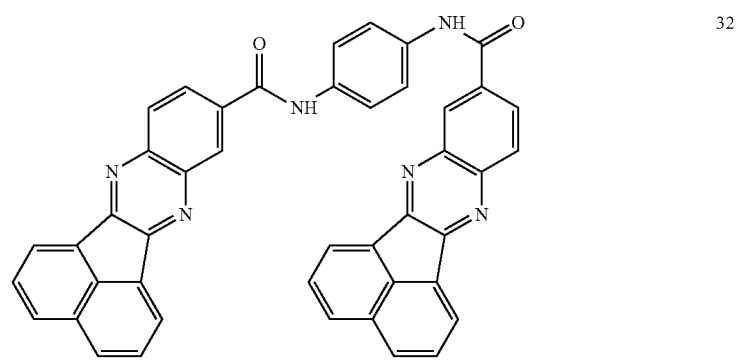
32

TABLE 1-continued
Examples of polycyclic organic compounds for the insulating layers
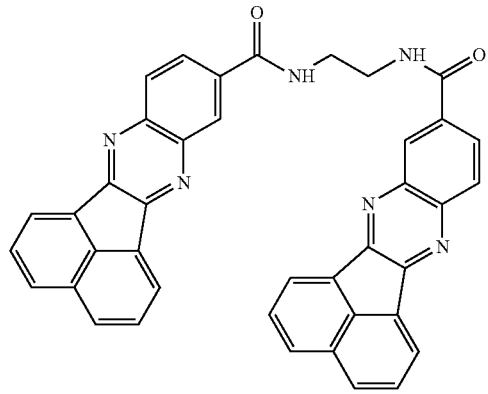 [SMILES: O=C(NCCNC(=O)c1ccc2nc3c(nc2c1)-c1cccc2cccc-3c12)c1ccc2nc3c(nc2c1)-c1cccc2cccc-3c12]
33
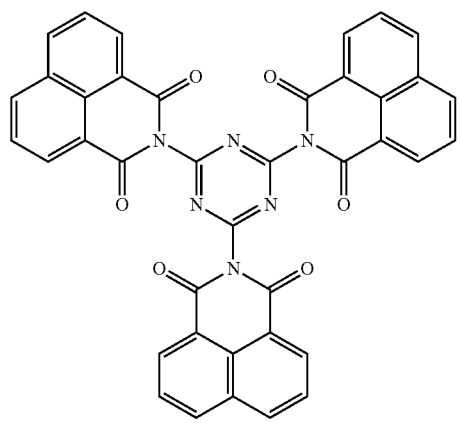 [SMILES: O=C1c2cccc3cccc(c23)C(=O)N1c1nc(N2C(=O)c3cccc4cccc(c34)C2=O)nc(N2C(=O)c3cccc4cccc(c34)C2=O)n1]
34
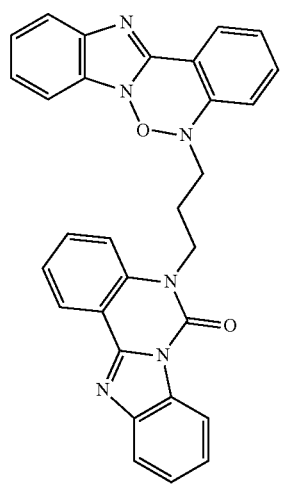 [SMILES: O=c1n(CCCN2On3c(nc4ccccc43)-c3ccccc32)c2ccccc2c2nc3ccccc3n12]
35

TABLE 1-continued
Examples of polycyclic organic compounds for the insulating layers
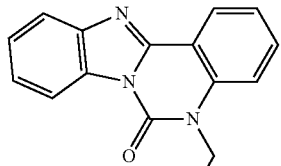
36
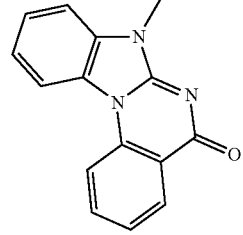
37
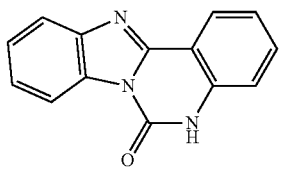 [SMILES: O=c1[nH]c2ccccc2c2nc3ccccc3n12]
38
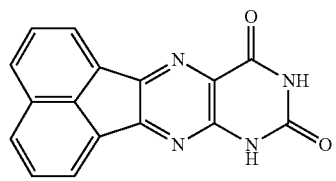 [SMILES: O=c1[nH]c(=O)c2nc3c(nc2[nH]1)-c1cccc2cccc-3c12]
39
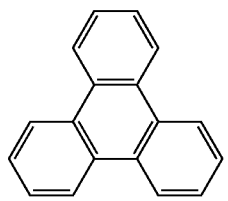 [SMILES: c1ccc2c(c1)c1ccccc1c1ccccc21]
40
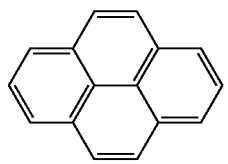
41
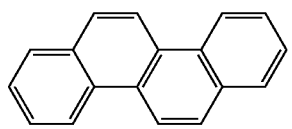 [SMILES: c1ccc2c(c1)ccc1c3ccccc3ccc21]
41
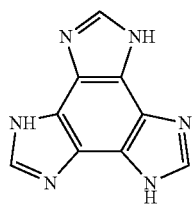 [SMILES: c1nc2c([nH]1)c1nc[nH]c1c1nc[nH]c21]

TABLE 1-continued

Examples of polycyclic organic compounds for the insulating layers

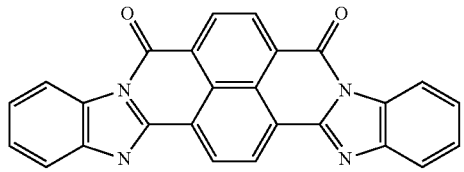

42

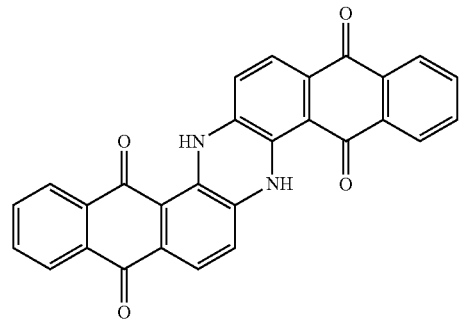 [SMILES: O=c1c2ccccc2c(=O)c2c1ccc1[nH]c3c(ccc4c(=O)c5ccccc5c(=O)c43)[nH]c12]

43

In another embodiment of the present invention, the modifying functional groups are selected from the list comprising alkyl, aryl, substituted alkyl, substituted aryl, and any combination thereof. The modifying functional groups provide solubility of organic compounds at the stage of manufacturing and additional insulating properties to the solid insulating layer of the capacitor. In yet another embodiment of the present invention, the insulating layers comprise polymeric materials selected from the list comprising fluorinated alkyls, polyethylene, poly(vinylidene fluoride-hexafluoropropylene), polypropylene, fluorinated polypropylene, polydimethylsiloxane. In still another embodiment of the present invention, the insulating layers comprise a polymeric material formed on the basis of polymers which are selected from the structures 44 to 49 as given in Table 2.

TABLE 2

Examples of polymers for the insulating layers

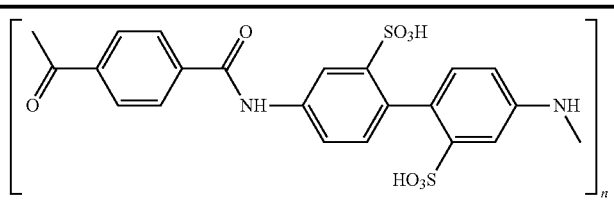

44 poly(2,2'-disulfo-4,4'-benzidine terephthalamide)

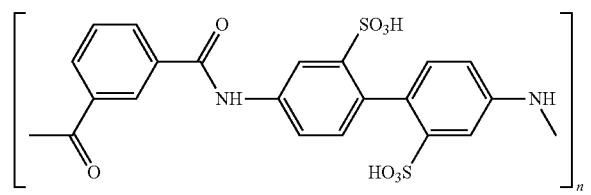

45 poly(2,2'-disulfo-4,4'-benzidine isophthalamide)

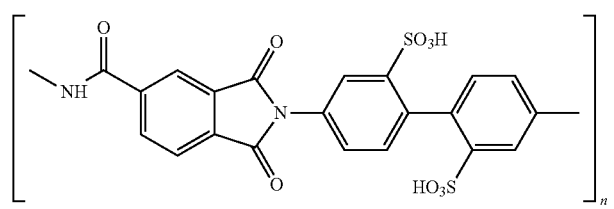

46 poly(2,2'-disulfo-4,4'-benzidine 1,3-dioxo-isoindoline-5-carboxamide)

TABLE 2-continued

Examples of polymers for the insulating layers

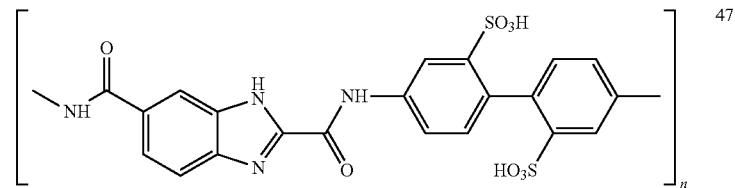

poly(2,2'-disulfo-4,4'-benzidine 1H-benzimidazole-2,5-dicarboxamide)

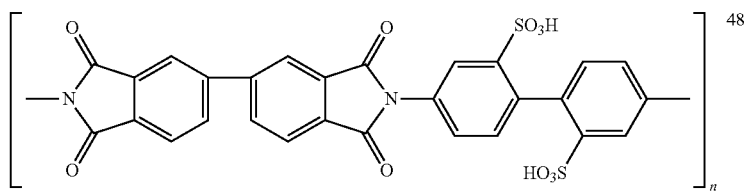

poly(2,2'-disulfo-4,4'-benzidine 3,3',4,4'-biphenyl tetracarboxylic acid diimide)

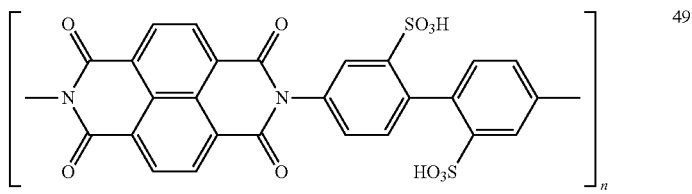

poly(2,2'disulpho-4,4'benzidine 1,4,5,8-naphtalen tetracarboxylic acid diimide)

The listed materials intended for the insulating layers provide a high intensity of an electric field which is not less than 0.1 Volt per nanometer.

A wide variety of conducting and semiconducting (conjugated) polymers can be used as conductive layers of the present invention. This variety of polymers have a unique set of properties, combining the electronic properties of metals and semiconductors with the processing advantages and mechanical properties of polymers, see A. J. Heeger, et al., "Semiconducting and Metallic Polymers.", Oxford Graduate Texts, Oxford Press, 2010.

For the disclosed energy storage device the solid conductive layer may possess a different structure in the range between an amorphous and crystalline solid layer, depending on the material and manufacturing procedure used.

In one embodiment of the present invention the conductive layer is crystalline.

In another embodiment of the present invention, the conductive layer comprises material possessing molecular conductivity. A conductive material possessing molecular conductivity refers to a material containing organic molecules wherein electric charges are moved under action of an external electric field within the limits of these molecules. As a result of displacement of mobile charges inside of this molecule, an electric dipole oriented along the electric field is formed (Jean-Pierre Farges, Organic Conductors, Fundamentals and applications, Marcell-Dekker Inc. NY. 1994).

In one embodiment of the present invention, the conductive layers comprise electroconductive oligomers. In another embodiment of the present invention, the longitudinal axes of the electroconductive oligomers are directed predominantly perpendicularly in relation to the electrode surface. In yet another embodiment of the present invention, the longitudinal axes of the electroconductive oligomers are directed predominantly parallel in relation to the electrode surface.

In still another embodiment of the present invention, the conductive layer comprising the electroconductive oligomers predominantly possesses lateral translational symmetry. Translational symmetry of the object means that a shift on a certain vector does not change the object.

In one embodiment of the present invention, the electroconductive oligomers are selected from the list comprising following structural formulas corresponding to one of structures 50 to 56 as given in Table 3.

TABLE 3

Examples of polymers for the conductive layers

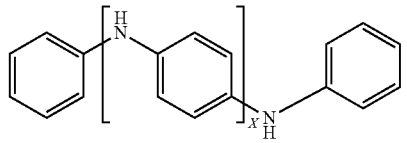
50

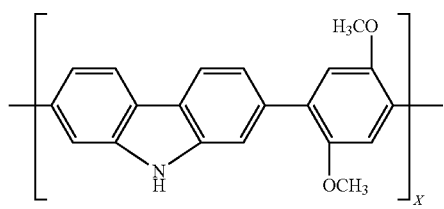
51

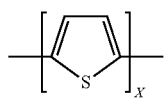
52

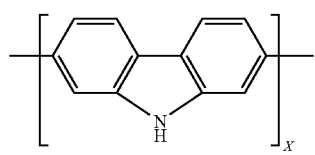
53

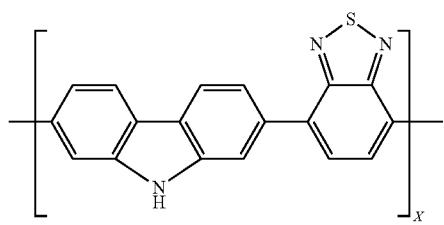
54

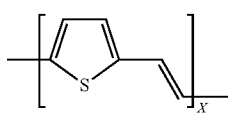
55

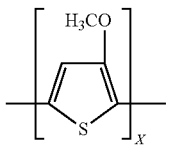
56 where X=2, 3, 4, 5, 6, 7, 8, 9, 10, 11 or 12

In another embodiment of the energy storage device of the present invention, the conductive layer comprises low-molecular weight electroconductive polymers. In another embodiment of the present invention, the low-molecular weight electroconductive polymer contains monomers selected from the structures 50 to 56 as given in Table 3. In another embodiment of the disclosed energy storage device, the electroconductive oligomers further comprise substitute groups and are described by the following general structural formula II:

$$(\text{electroconductive oligomer})\text{-R}_q \qquad (II)$$

where $R_q$ is a set of substitute groups, q is a number of the substitute groups R in the set $R_q$, and q=1, 2, 3, 4, 5, 6, 7, 8, 9, or 10. In yet another embodiment of the present invention, the substituents R are independently selected from the list comprising alkyl, aryl, substituted alkyl, substituted aryl, and any combination thereof In still another embodiment of the present invention, thickness of the insulating layer ($d_{ins}$), thickness of the conductive layer ($d_{cond}$), number of the insulating layers ($n_{ins} \geq 2$), dielectric permittivity of the insulating dielectric material ($\in_{ins}$) and dielectric permittivity of the conductive layer ($\in_{cond}$) satisfy the following relation:

$$d_{cond} = p \cdot (n_{ins}/(n_{ins}-1)) \cdot (\in_{cond}/\in_{ins}) \cdot d_{ins}, \text{ where } p \geq 3. \qquad (6)$$

Electrodes of the disclosed energy storage device may be made of any suitable material, including but not limited to Pt, Cu, Al, Ag or Au.

The disclosed energy storage device can be produced by a variety of manufacturing methods, which in general comprise the steps of a) preparation of a conducting substrate serving as one of the electrodes, b) formation of a multilayer structure, and c) formation of the second electrode on the multilayer structure. Formation of the multilayer structure comprises either alternating steps of the application of insulating and conductive layers or a step of coextrusion of layers.

In one embodiment of the present invention the alternating steps of the multilayer structure formation comprise successive alternating applications of solutions of liquid insulating and conductive layers, wherein each application is followed with a step of drying to form a solid insulating and conductive layers. Depending on the required design of the energy storage device, in particular on the number of layers in the multilayer structure, the alternating application steps are recurred until a formation of the multilayer structure is completed. In this embodiment the insulating layer is formed as the first and the last layer of the multilayer structure, being in direct contact with the electrodes.

In one embodiment of the present invention the alternating steps of the multilayer structure formation comprise successive alternating applications of melts of insulating and conductive layers, wherein each application is followed with a step of cooling down to form a solid insulating and conductive layers. Depending on the required design of the energy storage device, in particular on the number of layers in the multilayer structure, the alternating application steps are recurred until a formation of the multilayer structure is completed. In this embodiment the insulating layer is formed as the first and the last layer of the multilayer structure, being in direct contact with the electrodes.

In another embodiment of the present invention a step of coextrusion of layers comprises a step of coextrusion of set of liquid layers successively containing alternating conductive materials and insulating dielectric materials onto the substrate, and followed by drying to form the solid multilayer structure.

In another embodiment of the present invention a step of coextrusion of layers comprises a step of coextrusion of set of layers successively containing alternating melts of conductive materials and insulating dielectric materials onto the substrate, and followed by drying to form the solid multilayer structure.

Depending on the design of the energy storage device, in particular on the number of layers in the multilayer structure, the extrusion may be completed in one step or recurred until a formation of the multilayer structure is completed. The insulating layer is formed in direct contact with the electrodes.

In order that the invention may be more readily understood, reference is made to the following examples, which is intended to be illustrative of the invention, but is not intended to be limiting in scope.

EXAMPLE 1

Example 1 describes an energy storage device comprising a solid multilayer structure of two insulating and one conductive layer.

Figure 2:
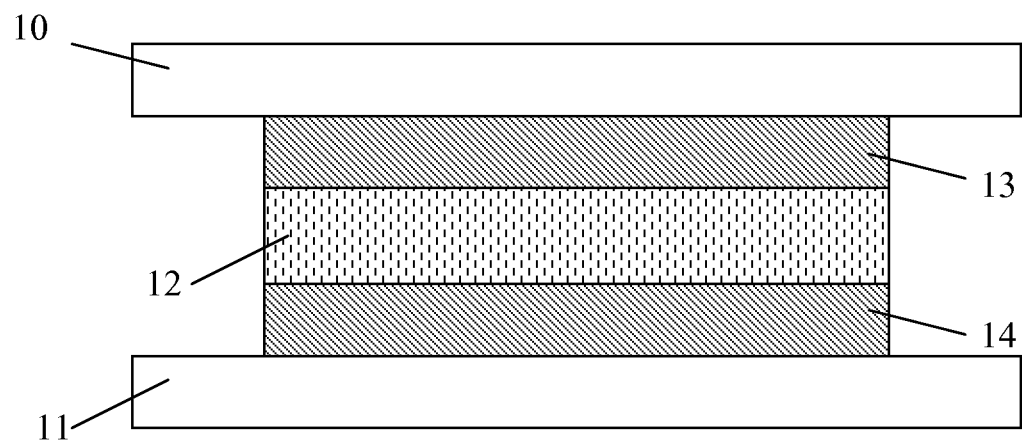
FIG. 2 is a schematic illustration that shows an energy storage device according to an embodiment of the invention.

The design of the energy storage device is shown in FIG. 2 and includes electrodes 10 and 11 and a solid multilayer structure comprising two layers of an insulating dielectric material (13 and 14) separated with one layer made of a conductive material (12). Polyaniline (PANI) was used as a conductive material, and polyethylene was used as an insulating dielectric material. Thickness of the insulating layer was $d_{ins}$=25 nm. Electrodes 10 and 11 were made of copper. Dielectric permittivity of polyethylene is equal to 2.2 (i.e. $\in_{ins}$=2.2). Breakdown voltage is $V_{bd}$=40 kilovolt on thickness of 1 millimeter (0.04 v/nm); thus, a polyethylene film of 25-nm thickness had a breakdown voltage equal to 1 volt. Therefore a working voltage of the capacitor did not exceed the breakdown voltage Vbd of two insulating layers with thickness 25 nm each which is approximately equal to 2 V. The conductive polymer material (polyaniline (PANI)) had dielectric permittivity $\in_{cond}$ equal to 1000 and thickness of $d_{cond}$=50 μm.

EXAMPLE 2

Example 2 describes an energy storage device comprising a solid multilayer structure of alternating insulating and conductive layers.

Figure 3:
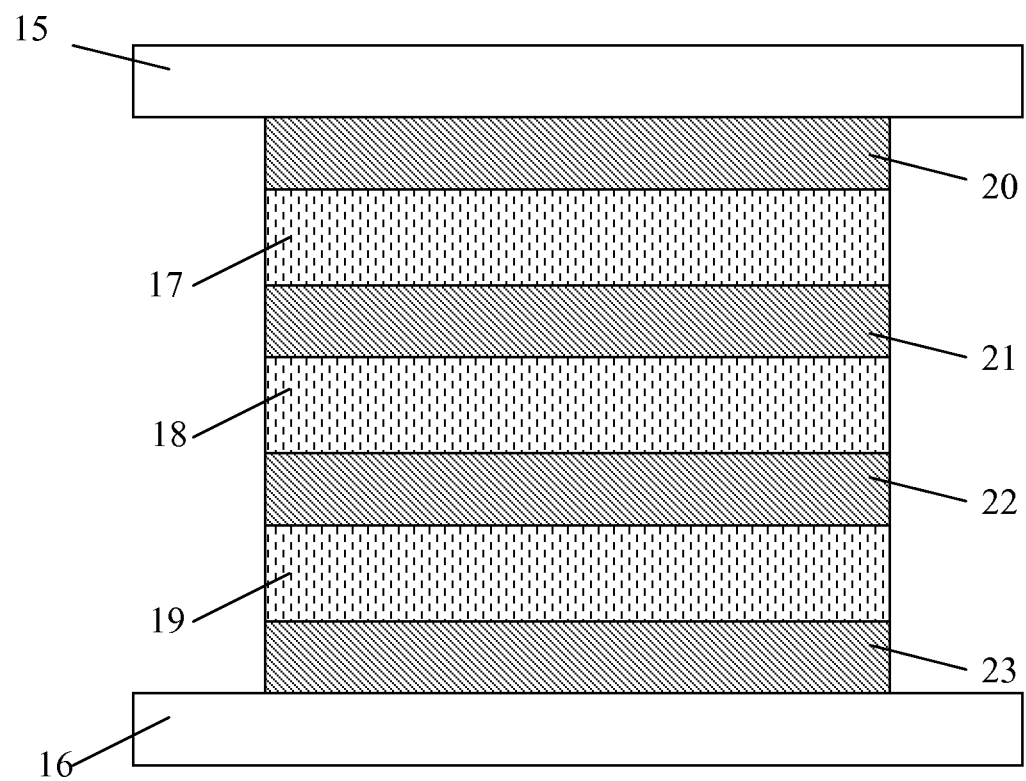
FIG. 3 is a schematic illustration that shows an energy storage device according to another embodiment of the invention.

The design of the energy storage device is shown in FIG. 3 and includes electrodes 15 and 16 and a solid multilayer structure comprising alternating layers of insulating and conductive materials, wherein layers of an insulating dielectric material (20, 21, 22, 23) were separated by layers made of a conductive material (17, 18, 19). Polyaniline (PANI) was used as a conductive material and polyethylene was used as an insulating dielectric material. Thickness of the insulating layer was $d_{ins}$=25 nm. Electrodes 15 and 16 were made of copper. Dielectric permittivity of polyethylene is equal to 2.2 (i.e. $\in_{ins}$=2.2) and breakdown voltage is $V_{bd}$=40 kilovolt on thickness of 1 millimeter. Thus, a polyethylene film of 25-nm thickness has a breakdown voltage equal to 1 volt. Therefore the working voltage of the capacitor did not exceed breakdown voltage Vbd which was approximately equal to 4 V. The conductive polymer material possessing (polyaniline (PANI)) had dielectric permittivity $\in_{cond}$ equal to 1000. In this example thickness of the layer comprising a conductive material was selected as $d_{cond}$=50 μm.

EXAMPLE 3

Example 3 describes calculation of number and thickness of insulating layers depending on value of working voltage of the capacitor. For manufacturing of energy storage device with a working voltage of 100 volt a number of 25-nm thick the insulating layers shall be increased and/or thickness of layers needs to be higher in order to create total thickness of insulating material about 2500 nm. For industrial applications manufacturing of the energy storage device with polyethylene used as an insulating layer with 25-nm thickness of each layer, a desired working voltage will require more than 100 layers. This estimation is based on a breakdown voltage of $V_{bd}$=40 kilovolt on thickness of 1 millimeter. Dielectric permittivity of a conductive material in this example is equal to one hundred thousand (100,000). Thickness of each conductive layer is approximately equal to 300 microns. At increasing of target working voltage up to 1000 volt, a required number of the insulating layers and their thickness is increased up to the D=N*d=25000 nm where D is total thickness of all layers, N—is number of layers, and d—is thickness of each layer.

Although the present invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An energy storage device comprising
   a first electrode,
   a second electrode, and
   a solid multilayer structure disposed between said first and second electrodes,
      wherein said electrodes are flat and planar and positioned parallel to each other, and
   wherein said solid multilayer structure comprises m insulating and conductive layers,
   said layers are disposed parallel to said electrodes, and
   said layers have the following sequence: A-B-(A-B- . . . A-B-)A, where
      A is a homogeneous insulating layer which comprises an insulating dielectric material,
      B is a homogeneous conductive layer, and
      m is equal to 3 or more,
   wherein an insulating layer thickness ($d_{ins}$), a conductive layer thickness ($d_{cond}$, a number) of the insulating layers ($n_{ins} \geq 2$), a dielectric permittivity of the insulating dielectric material ($\in_{ins}$) and a dielectric permittivity of the conductive layer ($\in_{cond}$) satisfy the following relation:

$$d_{cond}=p\cdot(n_{ins}/(n_{ins}-1)\cdot(\in_{cond}/\in_{ins})\cdot d_{ins}, \text{ where } p\geq 3.$$

2. An energy storage device according to claim 1, wherein said insulating layers are crystalline.

3. An energy storage device according to claim 1, wherein said insulating layers comprise modified organic compounds of the general structural formula I:

{Cor}(M)n,    (I)

where Cor is a polycyclic organic compound with conjugated π-system, M are modifying functional groups; and n is the number of the modifying functional groups, where n is equal to 1 or more.

4. An energy storage device according to claim 3, wherein the polycyclic organic compound is selected from the group consisting of oligophenyl, imidazole, pyrazole, acenaphthene, triaizine, and indanthrone, and the polycyclic organic compound has a general structural formula selected from the group consisting of structures 1-43 as follows:

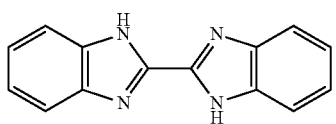
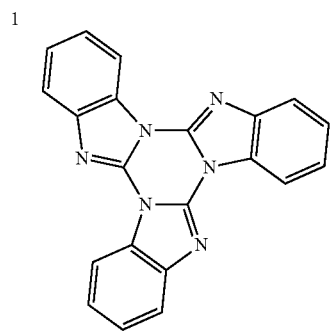
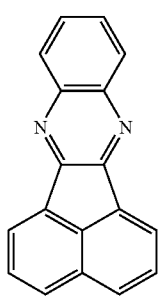
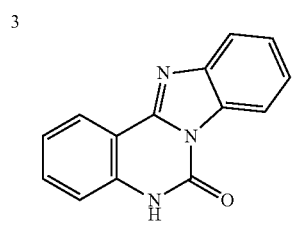
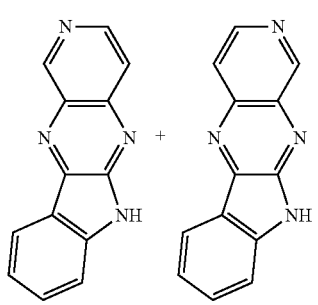
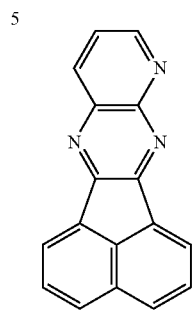
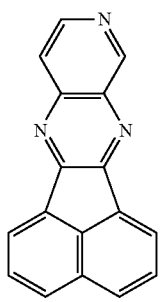
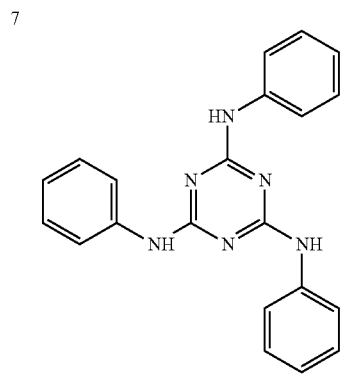

-continued
9
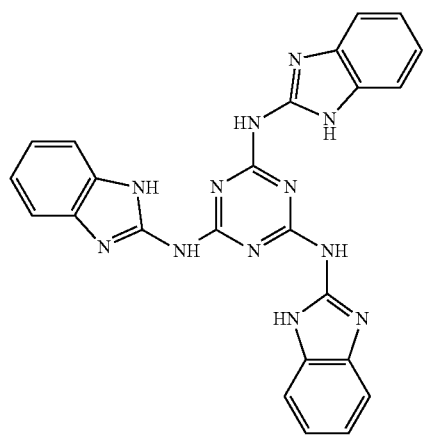
10
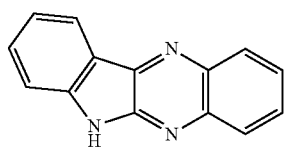
11
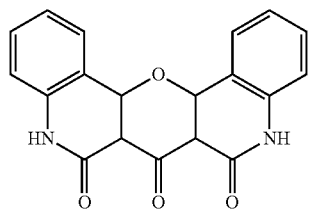
12
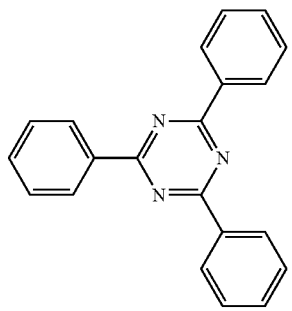
13
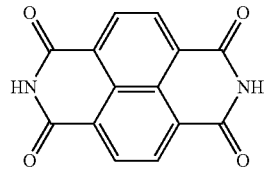
14
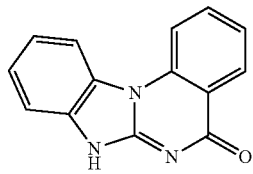
15
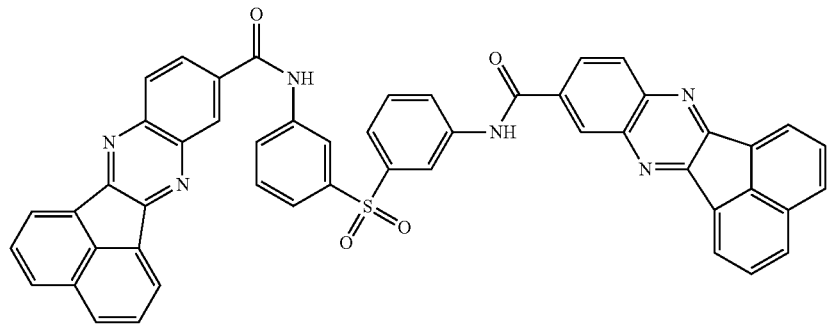
16
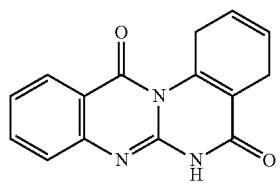
17
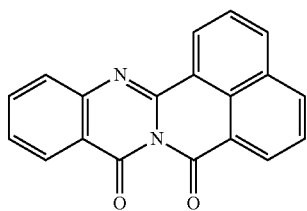

-continued
18
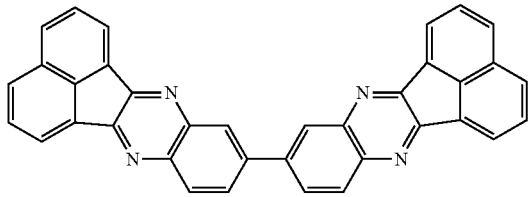
19
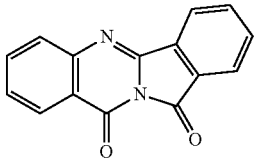
20
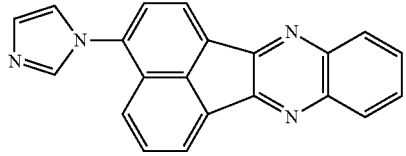
21
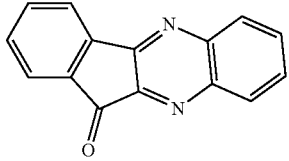
22
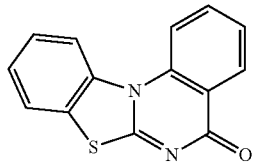
23
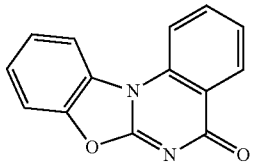
24
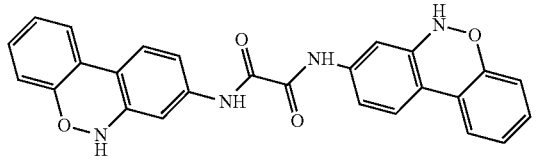
25
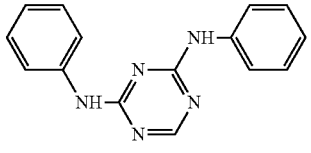
26
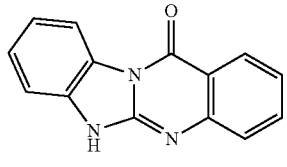
27
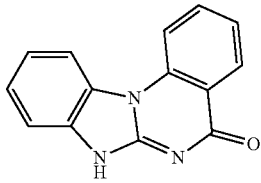
28
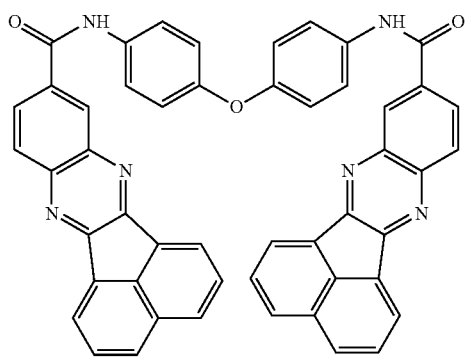
29
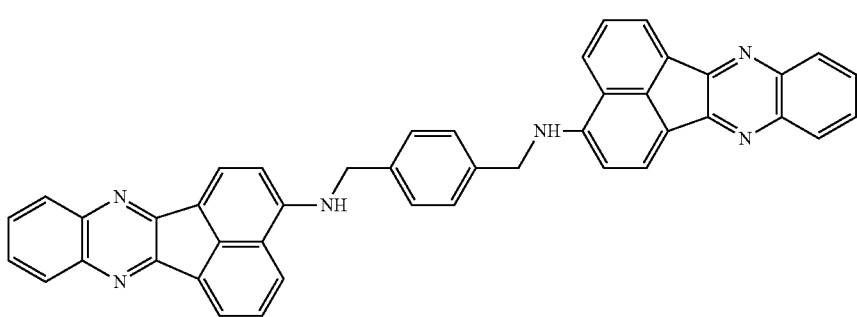

-continued
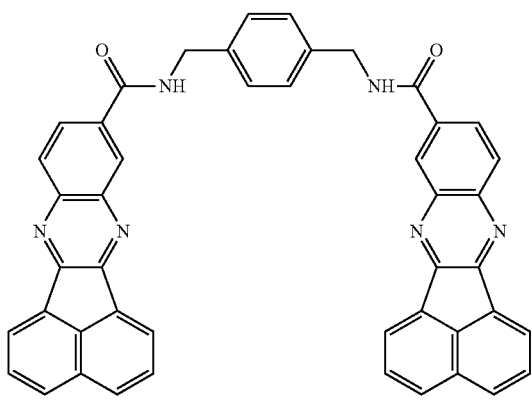
30
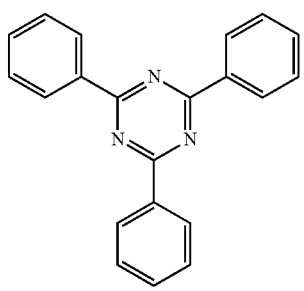
31
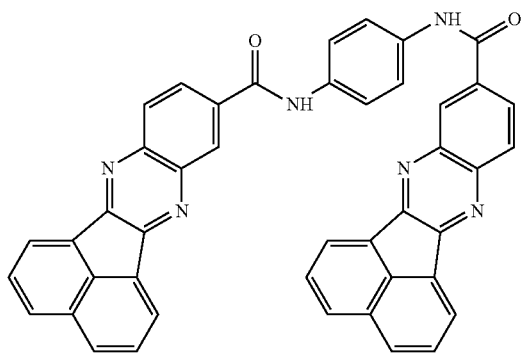
32
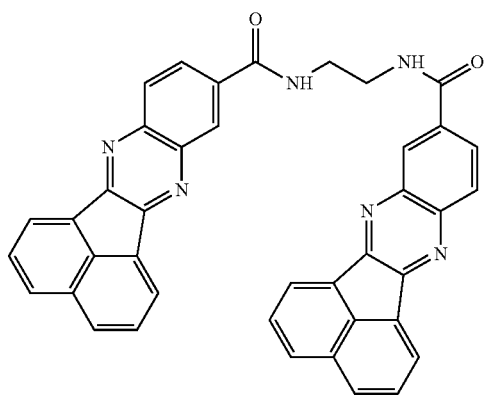
33
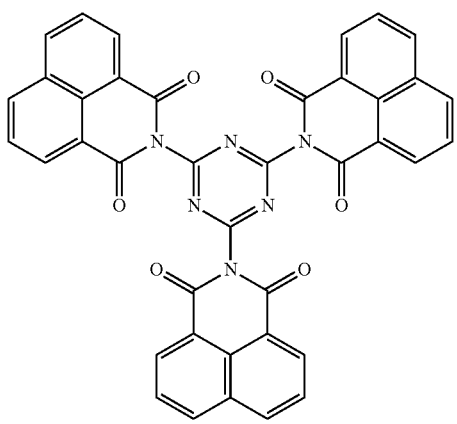
34
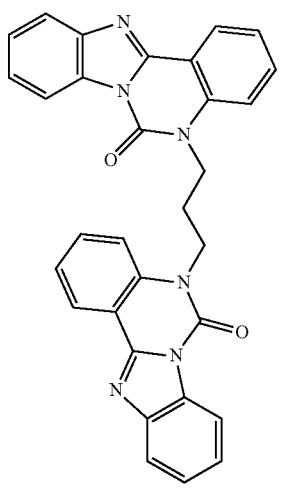
35

-continued

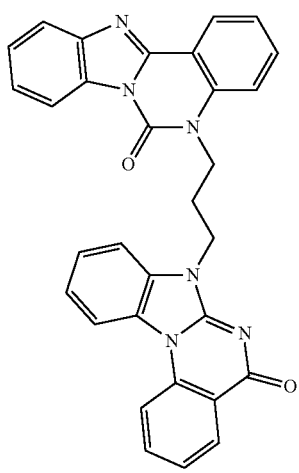
36

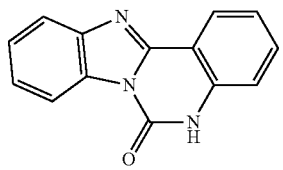
37

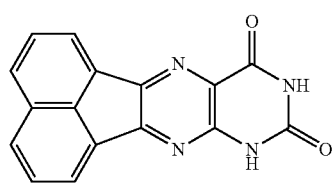
38

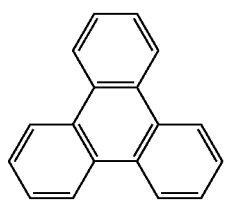
39

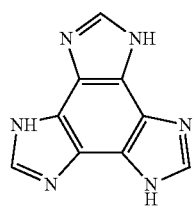
40

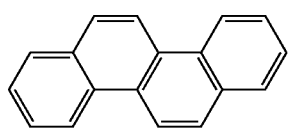
41

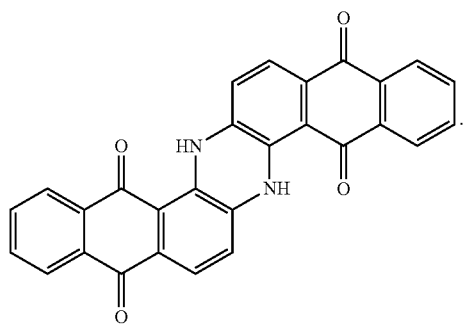
41

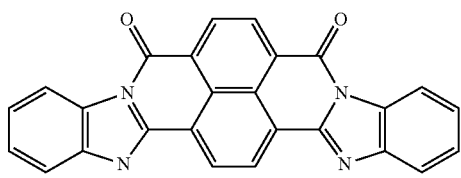
42

43

5. An energy storage device according to claim 3, wherein the modifying functional groups are selected from the group consisting of alkyl, aryl, substituted alkyl, substituted aryl, and any combination thereof.

6. An energy storage device according to claim 1, wherein said insulating layers comprise polymeric materials selected from the group consisting of fluorinated alkyls, polyethylene, kevlar, poly(vinylidene fluoride-hexafluoropropylene), polypropylene, fluorinated polypropylene, polydimethylsiloxane.

7. An energy storage device according to claim 1, wherein the insulating layers comprise a polymeric material formed with units selected from structures 44 to 49 as follows:

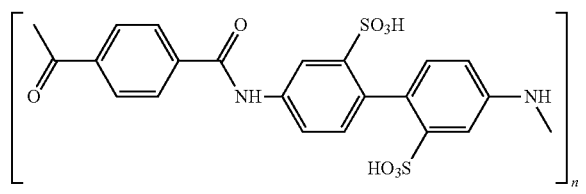

poly(2,2'-disulfo-4,4'-benzidine terephthalamide) 44

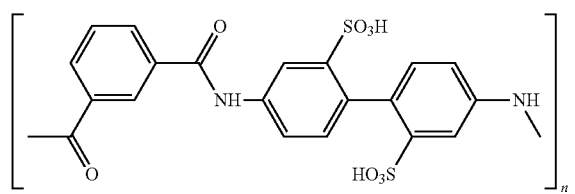

poly(2,2'-disulfo-4,4'-benzidine isophthalamide) 45

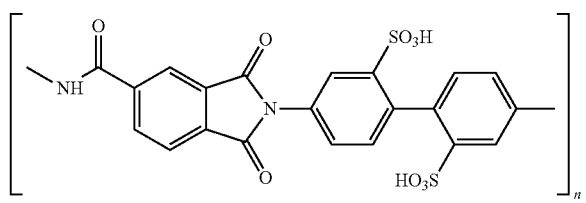

poly(2,2'-disulfo-4,4'-benzidine 1,3-dioxo-isoindoline-5-carboxamide) 46

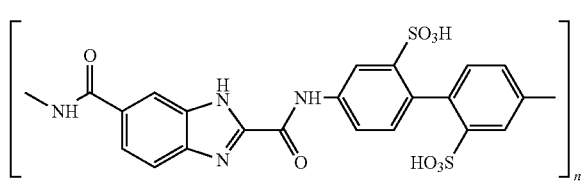

poly(2,2'-disulfo-4,4'-benzidine 1H-benzimidazole-2,5-dicarboxamide) 47

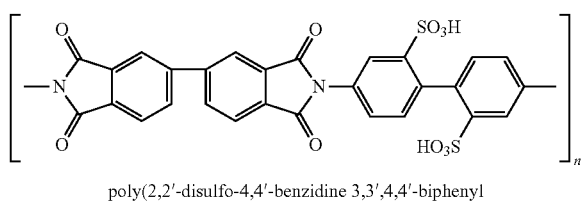

poly(2,2'-disulfo-4,4'-benzidine 3,3',4,4'-biphenyl tetracarboxylic acid diimide) 48

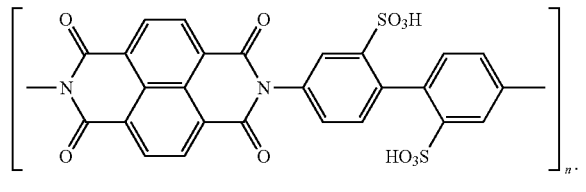

poly(2,2'disulpho-4,4'benzidine 1,4,5,8-naphtalen tetracarboxylic acid diimide) 49

8. An energy storage device according to claim 1, wherein the conductive layers are crystalline.

9. An energy storage device according to claim 1, wherein the conductive layers comprise material possessing molecular conductivity.

10. An energy storage device according to claim 1, wherein said conductive layers comprise electroconductive oligomers.

11. An energy storage device according to claim 10, wherein longitudinal axes of the electroconductive oligomers are directed predominantly perpendicularly to the electrodes.

12. An energy storage device according to claim 10, wherein longitudinal axes of the electroconductive oligomers are directed predominantly parallel to the electrodes.

13. An energy storage device according to claim 10, wherein the electroconductive oligomers predominantly possess lateral translational symmetry.

14. An energy storage device according to claim 10, wherein the electroconductive oligomers are selected from the group consisting of structures 50 to 56 as follows:

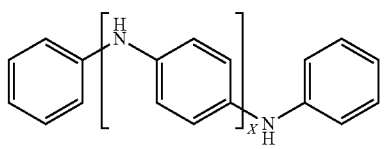

50

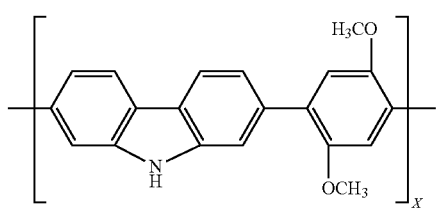

51

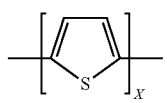

52

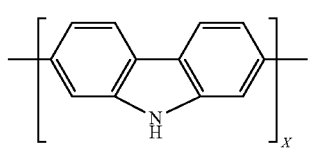

53

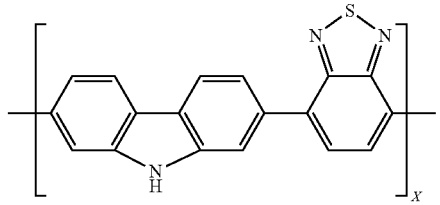

54

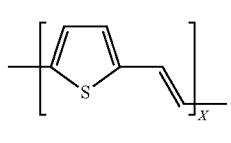

55

56 where X = 2, 3, 4, 5, 6, 7, 8, 9, 10, 11 or 12.

15. An energy storage device according to claim 1, wherein said conductive layers comprise low-molecular weight electroconductive polymers.

16. An energy storage device according to claim 15, wherein the low-molecular weight electroconductive polymers have monomers selected from the group consisting of structures 50 to 56 as follows:

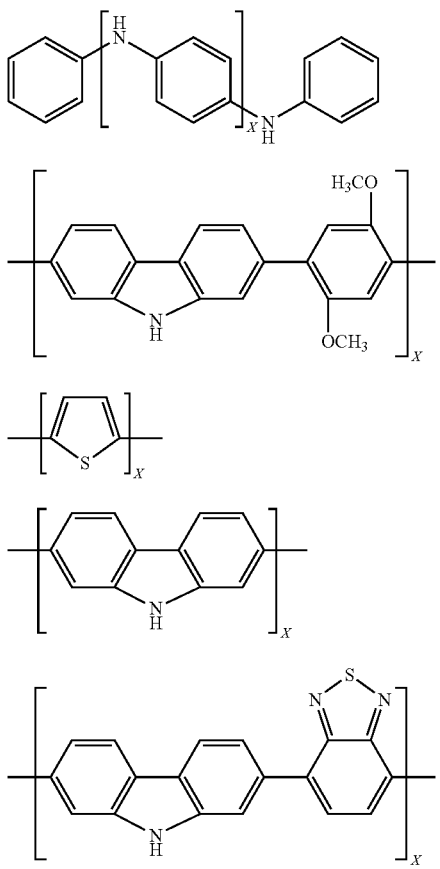

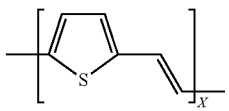

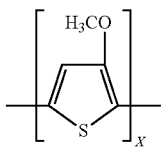

where X = 2, 3, 4, 5, 6, 7, 8, 9, 10, 11 or 12.

17. An energy storage device according to claim 10, wherein the electroconductive oligomers further comprise substitute groups and are described by the following general structural formula II:

$$(\text{electroconductive oligomer})\text{-}R_q \qquad (II)$$

where $R_q$ is a set of substitute groups, and q is a number of the substitute groups R in the set $R_q$, q equals to 1, 2, 3, 4, 5, 6, 7, 8, 9 or 10.

18. An energy storage device according to claim 17, wherein the substitute groups R are independently selected from the group consisting of alkyl, aryl, substituted alkyl, substituted aryl, and any combination thereof.

19. An energy storage device according to claim 1, wherein the electrodes comprise Pt, Cu, Al, Ag and/or Au.

20. An energy storage device according to claim 1, wherein the electrodes comprise copper, m is equal to 3, the insulating dielectric material A comprises polyethylene, the conductive material B comprises polyaniline (PANI), insulating layer thickness is $d_{ins}$=25 nm, conductive layer thickness $d_{cond}$=50 μm, and a breakdown voltage $V_{bd}$ is approximately 2 V.

21. An energy storage device according to claim 1, wherein said electrodes comprise copper, m is equal to 7, the insulating dielectric material comprises polyethylene, the conductive material comprises polyaniline (PANI), insulating layer thickness is $d_{ins}$=25 nm, conductive layer thickness is $d_{cond}$=50 μm, and a breakdown voltage $V_{bd}$ is approximately 4 V.

* * * * *